(12) United States Patent
Motoyama et al.

(10) Patent No.: US 9,348,917 B2
(45) Date of Patent: May 24, 2016

(54) ELECTRONIC DOCUMENT RETRIEVAL AND REPORTING USING INTELLIGENT ADVANCED SEARCHING

(71) Applicants: Tetsuro Motoyama, Los Altos, CA (US); Jiang Hong, San Jose, CA (US); Candice Lin, Cupertino, CA (US); Pingping Pan, Sunnyvale, CA (US); Yuwen Wu, Sunnyvale, CA (US)

(72) Inventors: Tetsuro Motoyama, Los Altos, CA (US); Jiang Hong, San Jose, CA (US); Candice Lin, Cupertino, CA (US); Pingping Pan, Sunnyvale, CA (US); Yuwen Wu, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 104 days.

(21) Appl. No.: 14/170,505

(22) Filed: Jan. 31, 2014

(65) Prior Publication Data
US 2015/0220638 A1    Aug. 6, 2015

(51) Int. Cl.
*G06F 17/30* (2006.01)
*G06F 3/0484* (2013.01)
*G06F 3/0482* (2013.01)

(52) U.S. Cl.
CPC ........ *G06F 17/30864* (2013.01); *G06F 3/0482* (2013.01); *G06F 3/04847* (2013.01); *G06F 17/30637* (2013.01); *G06F 17/30646* (2013.01); *G06F 17/30967* (2013.01)

(58) Field of Classification Search
CPC ..................... G06F 17/30398; G06F 17/30864; G06F 17/30646; G06F 17/3084; G06F 17/30637; G06F 17/30967; G06F 17/30899; G06F 17/30395; G06F 3/0482; G06F 3/04847; Y10S 707/99933; Y10S 15/968

USPC .......................................................... 707/722
See application file for complete search history.

(56) References Cited

U.S. PATENT DOCUMENTS

| | | | |
|---|---|---|---|
| 5,924,068 A * | 7/1999 | Richard ................. | H04N 7/088 345/901 |
| 5,963,938 A | 10/1999 | Wilson et al. | |
| 6,490,575 B1 * | 12/2002 | Berstis .............. | G06F 17/30566 |

(Continued)

FOREIGN PATENT DOCUMENTS

EP         2 728 494 A1       5/2014

OTHER PUBLICATIONS

European Patent Office, "Search Report" in application No. 14191009.1-1951, dated Mar. 24, 2015, 9 pages.

(Continued)

*Primary Examiner* — Thanh-Ha Dang
(74) *Attorney, Agent, or Firm* — Hickman Palermo Becker Bingham LLP; Edward A. Becker

(57) ABSTRACT

An approach is provided for retrieving electronic documents. The approach provides a Web-based graphical user interface that allows users to construct complex queries that include Boolean clauses, proximity clauses and/or keyword phrases, without requiring the users to have a working knowledge of query languages. The Web-based graphical user interface also allows users to specify a semantic meaning for one or more search terms. The approach also allows users to generate various reports for search results. Various filters may be applied to manage the amount of reporting data and semantic meanings may be applied to increase relevancy. A time cost estimator provides an estimated review time for search results. Also included are approaches for using the results of simple searches to perform advanced searches, for estimating the cost and/or time for reviewing search results and for performing tagging analysis and for using logical custodians.

20 Claims, 31 Drawing Sheets

(56) References Cited

U.S. PATENT DOCUMENTS

| | | |
|---|---|---|
| 6,925,608 B1 | 8/2005 | Neale et al. |
| 7,383,513 B2 | 6/2008 | Goldberg et al. |
| 7,483,869 B2 | 1/2009 | Kumar |
| 7,516,118 B1 | 4/2009 | Badros |
| 7,739,221 B2 | 6/2010 | Lawler et al. |
| 7,890,503 B2 | 2/2011 | Murarka |
| 8,326,836 B1 | 12/2012 | Pike |
| 8,423,541 B1 | 4/2013 | Baluja |
| 8,495,487 B2 | 7/2013 | Jerome |
| 8,549,436 B1* | 10/2013 | Capriati ............ G06F 17/30864 715/776 |
| 8,560,531 B2 | 10/2013 | Megler et al. |
| 8,793,266 B2 | 7/2014 | Ishikawa et al. |
| 9,020,936 B2 | 4/2015 | Svore et al. |
| 9,075,498 B1 | 7/2015 | Wiggins |
| 2004/0039933 A1 | 2/2004 | Martin |
| 2004/0083206 A1 | 4/2004 | Wu |
| 2005/0004911 A1 | 1/2005 | Goldberg et al. |
| 2005/0246303 A1 | 11/2005 | Kumar |
| 2006/0036565 A1 | 2/2006 | Bruecken |
| 2006/0074902 A1 | 4/2006 | Anderson |
| 2006/0155598 A1 | 7/2006 | Spurr |
| 2006/0161535 A1 | 7/2006 | Holbrook |
| 2006/0190436 A1* | 8/2006 | Richardson ......... G06F 17/3064 |
| 2007/0100795 A1 | 5/2007 | Davies |
| 2008/0082490 A1 | 4/2008 | MacLaurin |
| 2008/0189608 A1 | 8/2008 | Nurmi |
| 2008/0201318 A1 | 8/2008 | McNew |
| 2008/0275868 A1* | 11/2008 | Zer ................... G06F 17/30398 |
| 2009/0073501 A1 | 3/2009 | Gutarin |
| 2009/0099969 A1* | 4/2009 | Hoeg .................... G06Q 30/00 705/80 |
| 2009/0133116 A1 | 5/2009 | Waisbard |
| 2009/0271368 A1* | 10/2009 | Channell ........... G06F 17/30864 |
| 2009/0327257 A1* | 12/2009 | Abouzeid ......... G06F 17/30592 |
| 2010/0077301 A1 | 3/2010 | Bodnick |
| 2010/0153363 A1 | 6/2010 | Suzuki |
| 2010/0185600 A1* | 7/2010 | Shin .................. G06F 17/30864 707/707 |
| 2010/0198627 A1* | 8/2010 | Moed .................... G06Q 10/02 705/5 |
| 2010/0290094 A1 | 11/2010 | Nagarajan |
| 2010/0299701 A1 | 11/2010 | Liu |
| 2011/0029563 A1* | 2/2011 | Coiera ............. G06F 17/30637 707/779 |
| 2011/0040752 A1 | 2/2011 | Svore et al. |
| 2011/0153582 A1 | 6/2011 | Buchmann |
| 2011/0238486 A1 | 9/2011 | Liu |
| 2012/0005148 A1 | 1/2012 | Horvitz |
| 2012/0084328 A1* | 4/2012 | Ishikawa .......... G06F 17/30651 707/805 |
| 2012/0246153 A1* | 9/2012 | Pehle ................ G06F 17/30864 707/723 |
| 2013/0006976 A1 | 1/2013 | Megler et al. |
| 2013/0100139 A1 | 4/2013 | Schliesser |
| 2013/0246219 A1 | 9/2013 | Mishanski |
| 2014/0074951 A1 | 3/2014 | Misir |
| 2015/0012517 A1* | 1/2015 | Chakra ............. G06F 17/30867 707/706 |
| 2015/0101026 A1 | 4/2015 | Kraus |
| 2015/0127634 A1 | 5/2015 | Hong et al. |
| 2015/0128022 A1 | 5/2015 | Hong et al. |
| 2015/0161567 A1 | 6/2015 | Mondal |
| 2015/0220519 A1 | 8/2015 | Motoyama et al. |
| 2015/0220644 A1 | 8/2015 | Motoyama et al. |

OTHER PUBLICATIONS

U.S. Appl. No. 14/170,509, filed Jan. 31, 2014, Office Action, Mailing Date Sep. 30, 2015.

U.S. Appl. No. 14/074,503, filed Nov. 7, 2013, Notice of Allowance, Mailing Date Nov. 25, 2015.

U.S. Appl. No. 14/170,509, filed Jan. 31, 2014, Final Office Action, Mailing Date Feb. 1, 2016.

U.S. Appl. No. 14/170,508, filed Jan. 31, 2014, Office Action, Mailing Date Jan. 5, 2016.

U.S. Appl. No. 14/074,507, filed Nov. 7, 2013, Office Action, Mailing Date Jan. 15, 2016.

* cited by examiner

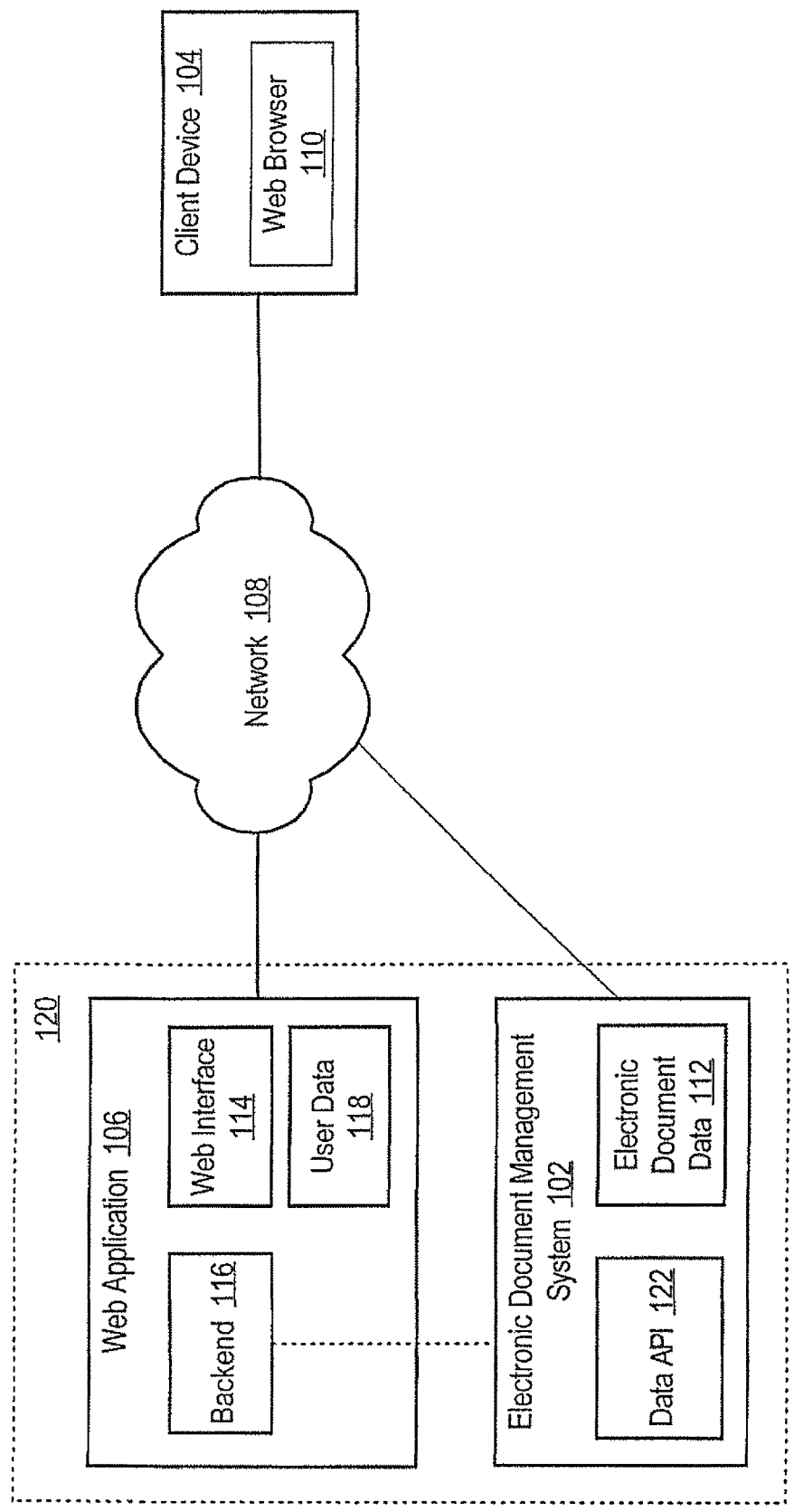

| Custodian User ID | Username | Role | Business Organization | Division | Location | Project |
|---|---|---|---|---|---|---|
| 74e34Bdh | Bob Holbrook | Manager | ABC Corp | Networking | Pittsburgh | Alpha |
| f84e493k | Dave Johnson | Engineer 1 | ABC Corp | Wireless | San Francisco | Beta |
| 3dk45k | Mike Steel | Designer 2 | ABC Corp | Security | Philadelphia | Gamma |

511b →

Business Organization
  Location
    Division
      Project
        Role
          Custodian User ID

FIG. 5D

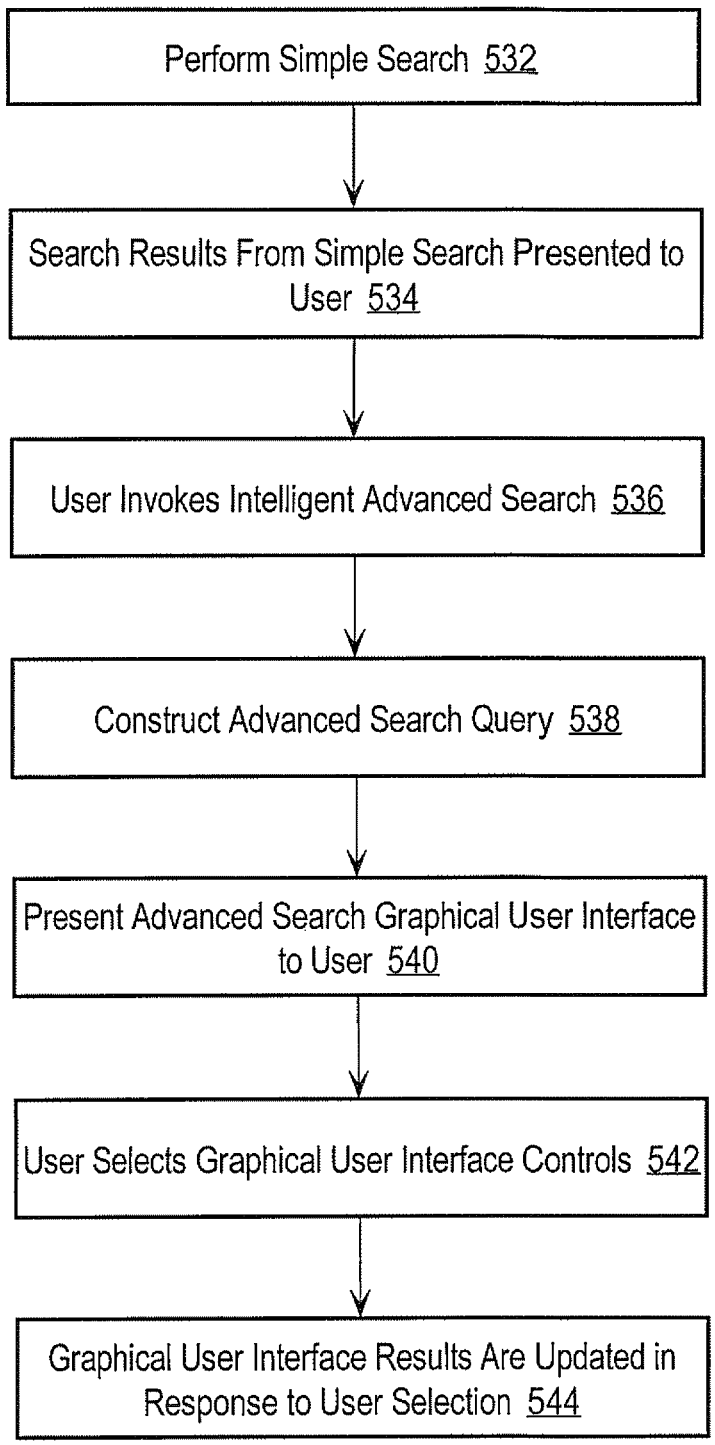

FIG. 5G

Pellego

Result(s) — 554

| Result # | Tag | File Name | File Type | Custodian | Domain | Semantic Meaning |
|---|---|---|---|---|---|---|
| 1 | tag1 | File 1 | Type 1 | C1 | D1 | S1 |
| 2 | tag3 | File 2 | Type 2 | C2 | D1 | S2 |
| 3 | tag2 | File 3 | Type 3 | C3 | D2 | S1 |
| 4 | tag2 | File 4 | Type 3 | C3 | D2 | S1 |
| 5 | tag2 | File 5 | Type 2 | C2 | D1 | S2 |
| 6 | tag1 | File 6 | Type 2 | C2 | D1 | S2 |
| 7 | tag3 | File 7 | Type 1 | C1 | D2 | S1 |
| 8 | tag3 | File 8 | Type 1 | C1 | D2 | S1 |
| 9 | tag1 | File 9 | Type 1 | C2 | D3 | S1 |
| 10 | tag2 | File 10 | Type 2 | C3 | D3 | S2 |

View Doc | Add Tag | Export Result

John Doe

RICOH
imagine. change.

Simple Search

Keyword or Phrase:
United States — 552

Date from:
Date to:
Source from: ◆ Parent ◆ Item

Search

550

Advanced Search — 556

FIG. 5I

| Result # | Tag | File Name | File Type | Custodian | Domain | Semantic Meaning |
|---|---|---|---|---|---|---|
| 1 | tag1 | File 1 | Type 1 | C1 | D1 | S1 |
| 2 | tag3 | File 2 | Type 2 | C2 | D1 | S2 |
| 3 | tag2 | File 3 | Type 3 | C3 | D2 | S1 |
| 4 | tag2 | File 4 | Type 3 | C3 | D2 | S1 |
| 5 | tag2 | File 5 | Type 2 | C2 | D1 | S2 |
| 6 | tag1 | File 6 | Type 2 | C2 | D1 | S1 |
| 7 | tag3 | File 7 | Type 1 | C1 | D2 | S2 |
| 8 | tag3 | File 8 | Type 1 | C1 | D2 | S1 |
| 9 | tag1 | File 9 | Type 1 | C2 | D3 | S1 |
| 10 | tag2 | File 10 | Type 2 | C3 | D3 | S2 |

| Assignor ID | Tag ID | Tag Category | Data Item ID |
|---|---|---|---|
| User 1 | Tag 1 | Category A | Document 1 |
| User 1 | Tag 2 | Category A | Document 1 |
| User 1 | Tag 3 | Category B | Document 2 |
| User 2 | Tag 3 | Category B | Document 2 |
| User 2 | Tag 4 | Category C | Document 3 |
| User 3 | Tag 1 | Category A | Document 1 |

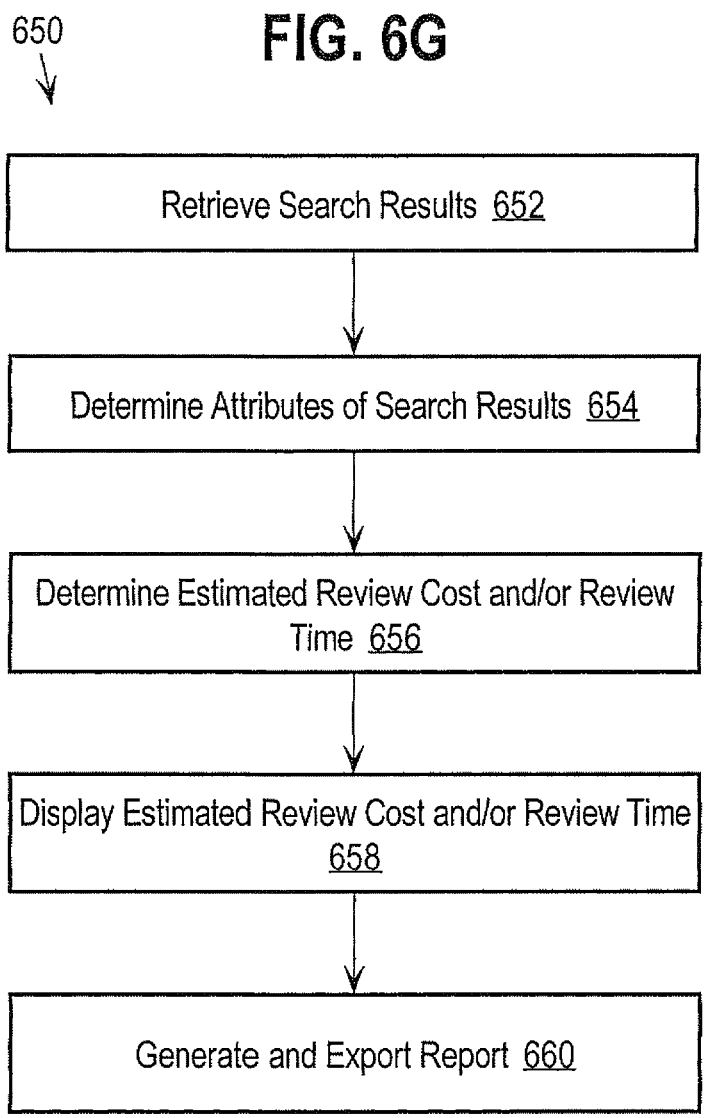

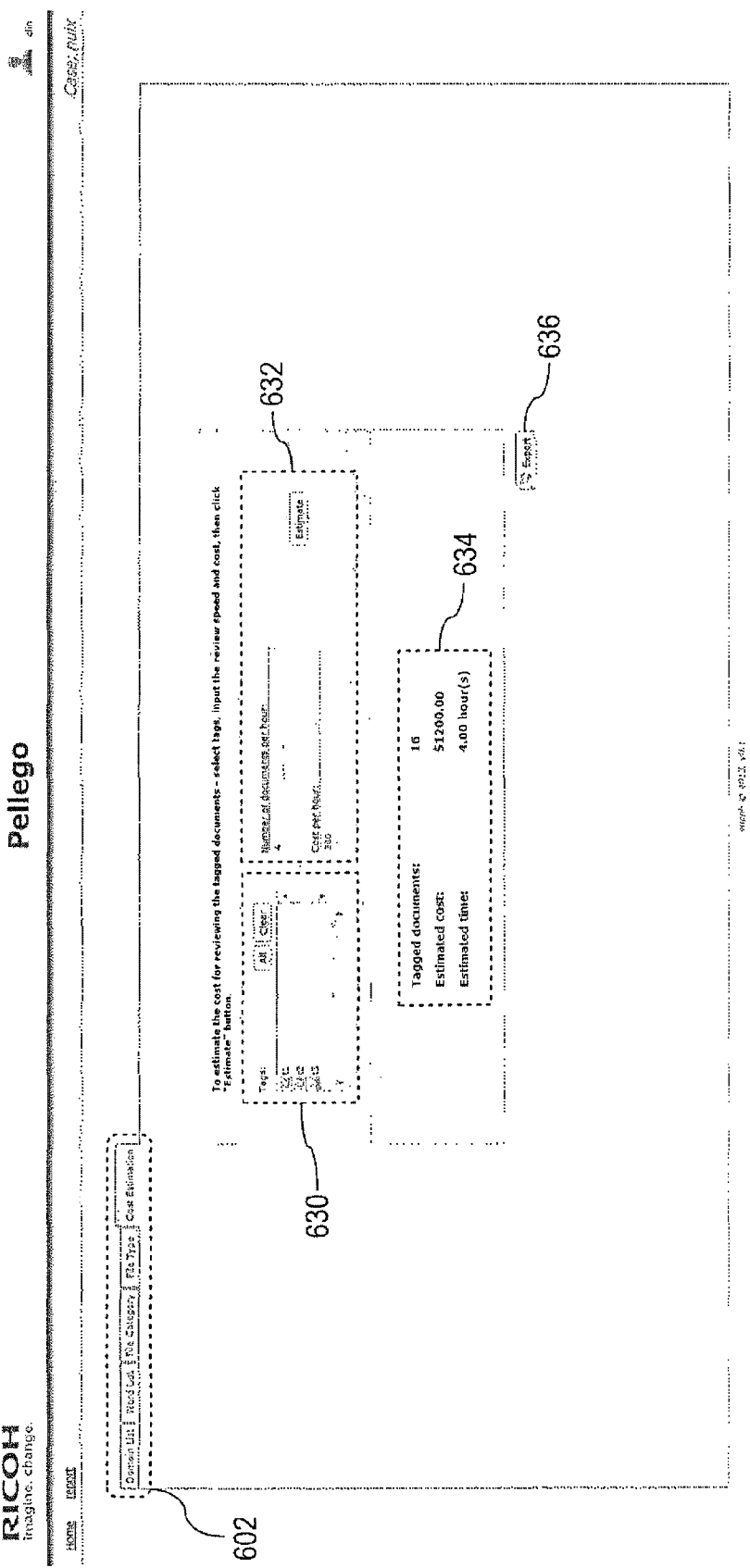

RICOH  1/8/14 2:34 PM

Cost Estimation Report

Number of document per hour: 4
Cost per hour: $300

Case: NUIX

| | |
|---|---|
| Tagged documents: | 16 |
| Estimated cost: | $1200.00 |
| Estimated time: | 4.00 hour(s) | ical user interface for performing a simple search.

ELECTRONIC DOCUMENT RETRIEVAL AND REPORTING USING INTELLIGENT ADVANCED SEARCHING

RELATED APPLICATION DATA

This application is related to U.S. patent application Ser. No. 14/074,503 entitled "Electronic Document Retrieval And Reporting", filed Nov. 7, 2013, and U.S. patent application Ser. No. 14/074,507 entitled "Electronic Document Retrieval And Reporting", filed Nov. 7, 2013, the contents all of which are incorporated by reference in their entirety for all purposes as if fully set forth herein.

FIELD

Embodiments relate generally to an approach for electronic document retrieval and reporting.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Current approaches for retrieving electronic documents from databases have significant limitations. One problem is that users are required to have specific knowledge and experience in constructing queries, for example, using a structure query language, which many users do not have. In addition, many database management systems offer limited reporting functionality, all of which can lead to an unsatisfactory user experience.

SUMMARY

One or more non-transitory computer-readable media storing instructions which, when processed by one or more processors, cause a Web application to generate and transmit to a client device over one or more networks, a first set of one or more Web pages which, when processed by a Web browser at the client device, provide a graphical user interface that allows a user to specify a simple search query that includes one or more search terms. The Web application receives the simple search query from the client device over the one or more networks and processes the simple search query against a plurality of data items to generate a set of search results. The Web application transmits to the client device over the one or more networks, a second set of one or more Web pages which, when processed by the Web browser at the client device, provide a graphical user interface that displays the set of search results. The Web application receives, from the client device over the one or more networks, a user request to perform an advanced search. In response to receiving, from the client device over the one or more networks, the user request to perform the advanced search, the Web application constructs, based upon the simple search query and the set of search results, an advanced search query that both has more search query terms than the simple search query and when processed against the plurality of data items, generates the set of search results, and generates and transmits to the client device over the one or more networks, a third set of one or more Web pages which, when processed by the Web browser at the client device, provide a graphical user interface that displays the advanced search query and allows the user to change one or more of the search query terms in the advanced search query.

One or more non-transitory computer-readable media storing instructions which, when processed by one or more processors, cause a Web application to retrieve tag assignment data for a plurality of data items, wherein the tag assignment data specifies a plurality of tag assignments and wherein each tag assignment, from the plurality of tag assignments, identifies a tag, an assignor of the tag and a data item to which the tag was assigned. The Web application generates, based upon the tag assignment data, tagging statistics that indicate one or more of a number of data items tagged by assignor, a number of data items tagged by assignor and by tag, or a number of tags by data item. The Web application generates a graphical user interface that visually depicts the tagging statistics.

BRIEF DESCRIPTION OF THE DRAWINGS

In the figures of the accompanying drawings like reference numerals refer to similar elements.

FIG. 1B depicts that a document management system may include a data Application Program Interface (API) that provides access to electronic document data on the electronic document management system.

FIG. 2A depicts an example user interface generated by a Web interface that provides an administrator portal that allows an administrator to manage users and user access rights.

FIG. 2B depicts an example user interface generated by a Web interface after an administrative user has selected to add a new user by selecting the "Add" control from controls depicted in FIG. 2A.

FIG. 2C depicts an example user interface that allows an administrative user to manage logs that track user activity.

FIG. 4 depicts an example user interface that allows a user to construct and submit for processing, queries for electronic documents.

FIG. 5A depicts an example user interface that allows a user to construct and submit for processing, complex queries for electronic documents.

FIG. 5B depicts a table of custodian data.

FIG. 5D depicts a second set of Boolean operator controls that allow a user to specify how a keyword phrase definition, defined by keyword phrase definition controls, will be combined in the complex query with a Boolean clause, defined via Boolean clause definition controls, and a proximity clause, defined by proximity clause definition controls.

FIG. 5F is a flow diagram that depicts an approach for performing an intelligent advanced search.

FIG. 5G is a block diagram that depicts an example graphical user interface for performing a simple search.

FIG. 5I depicts a graphical user interface screen after a user has de-selected a search results custodian attribute.

FIG. 6F depicts a table that contains tag assignment data.

FIG. 6G is a flow diagram that depicts an approach for determining and displaying one or more of an estimated cost and an estimated time to review search results according to an embodiment.

FIG. 6I depicts an example graphical user interface for determining and displaying an estimated cost and an estimated time to review search results.

FIG. 6J depicts an example report that includes all of the results information from the Cost Estimation tab depicted in FIG. 6H.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ELECTRONIC DOCUMENT MANAGEMENT ARCHITECTURE
  A. Electronic Document Management System
  B. Client Device
  C. Web Application
III. USER ADMINISTRATION AND LOGGING
IV. ELECTRONIC DOCUMENT RETRIEVAL
  A. Simple Search
  B. Advanced Search
  C. Semantic Meanings
  D. Intelligent Advanced Search
V. REPORTING
  A. Reporting Functionality
  B. Tagging Analysis
  C. Semantic Meanings
  D. Cost and Review Time Estimation
VI. IMPLEMENTATION MECHANISMS I. Overview An approach is provided for retrieving electronic documents. The approach provides a Web-based graphical user interface that allows users to construct complex queries that include Boolean clauses, proximity clauses and/or keyword phrases, without requiring the users to have a working knowledge of query languages. The Web-based graphical user interface also allows users to specify a semantic meaning for one or more search terms. The approach also allows users to generate various reports for search results. Various filters may be applied to manage the amount of reporting data and semantic meanings may be applied to increase relevancy. A time cost estimator provides an estimated review time for search results. The approach provides a user friendly approach for retrieve electronic documents and performing reporting. Also included are approaches for using the results of simple searches to perform advanced searches, for estimating the cost and/or time for reviewing search results and for performing tagging analysis and for using logical custodians.

II. Electronic Document Management Architecture

Figure 1A:
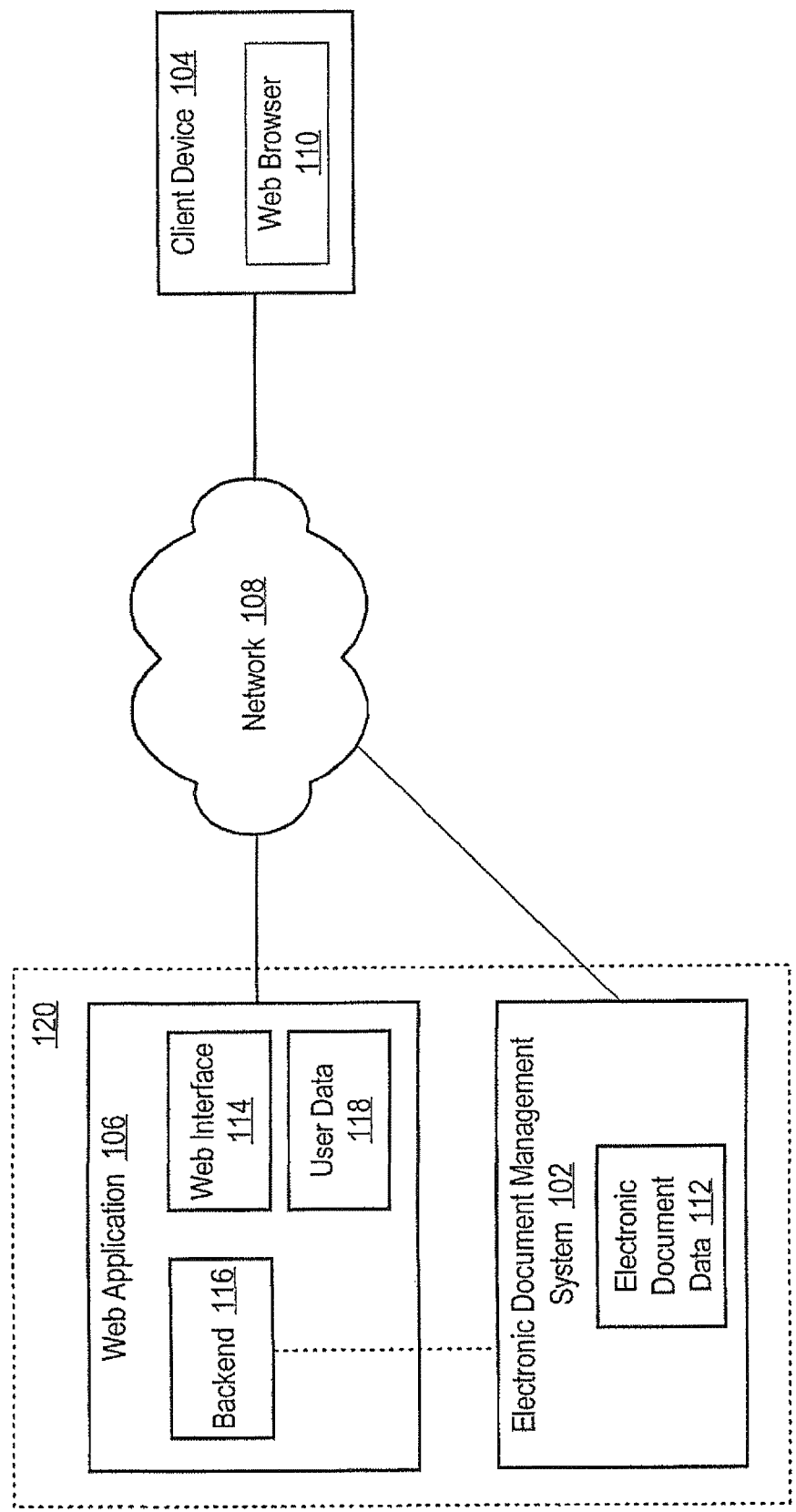
FIG. 1A is a block diagram that depicts an example arrangement for managing electronic documents.

FIG. 1A is a block diagram that depicts an example arrangement 100 for managing electronic documents. Embodiments are not limited to the example arrangement 100 depicted in FIG. 1A and other example arrangements are described hereinafter. In the example depicted in FIG. 1A, arrangement 100 includes an electronic document management system 102, a client device 104 and a Web application 106 communicatively coupled via a network 108. Network 108 may include any number of network connections, for example, one or more Local Area Networks (LANs), Wide Area Networks (WANs), Ethernet networks or the Internet, and/or one or more terrestrial, satellite or wireless links. The elements depicted in arrangement 100 may also have direct communications links, the types and configurations of which may vary depending upon a particular implementation.

A. Electronic Document Management System

Electronic document management system 102 may be implemented by hardware, computer software, or any combination of hardware and computer software for managing electronic documents. One non-limiting example implementation of electronic document management system 102 is a database management system and may include applications, such as those offered by Nuix North America, Inc. Electronic document management system 102 stores electronic document data 112 that may be any type of electronic document data in any form, including structured data and unstructured data. Examples of electronic document data 112 include, without limitation, word processing documents, spreadsheet documents, source code files, etc.

B. Client Device

Client device 104 may be any type of client device, depending upon the particular implementation. Example client devices include, without limitation, personal or laptop computers, workstations, tablet computers, personal digital assistants (PDAs) and telephony devices such as smart phones. Client device 104 may include applications including, for example, a Web browser 110 and other client-side applications. Client device 104 may include other elements, such as a user interface, one or more processors and memory, including volatile memory and non-volatile memory.

C. Web Application

Web application 106 includes a Web interface 114 and a backend 116 that provide access to electronic document data 112 stored on electronic document management system 102. Web interface 114 provides a Web-based interface, for example one or more Web pages, that can be accessed by a user of client device 104 via Web browser 110. As described in more detail hereinafter, the Web-based interface provided by Web interface 114 allows a user to construct queries and have those constructed queries processed by electronic document management system 102, for example, to search for electronic document data 112. In the arrangement 100 depicted in FIG. 1A, the constructed queries may be processed directly against electronic document data 112 via backend 116. Web application 106 may be hosted, for example, on a Web server that is not depicted in FIG. 1A for purposes of explanation. User data 118 specifies privileges and access rights of users to access Web application 106 and electronic document data 112. User data 118 is depicted in FIG. 1A as being part of Web application 106 but this is not required and user data 118 may be stored external to Web application 106 and accessed by Web application 106 via network 108.

As depicted in FIG. 1B, electronic document management system 102 may include a data Application Program Interface (API) 122 that provides access to electronic document data 112 on electronic document management system 102. In this example arrangement 100, access to electronic document data 112 is provided via backend 116 and data API 122.

Figure 1C:
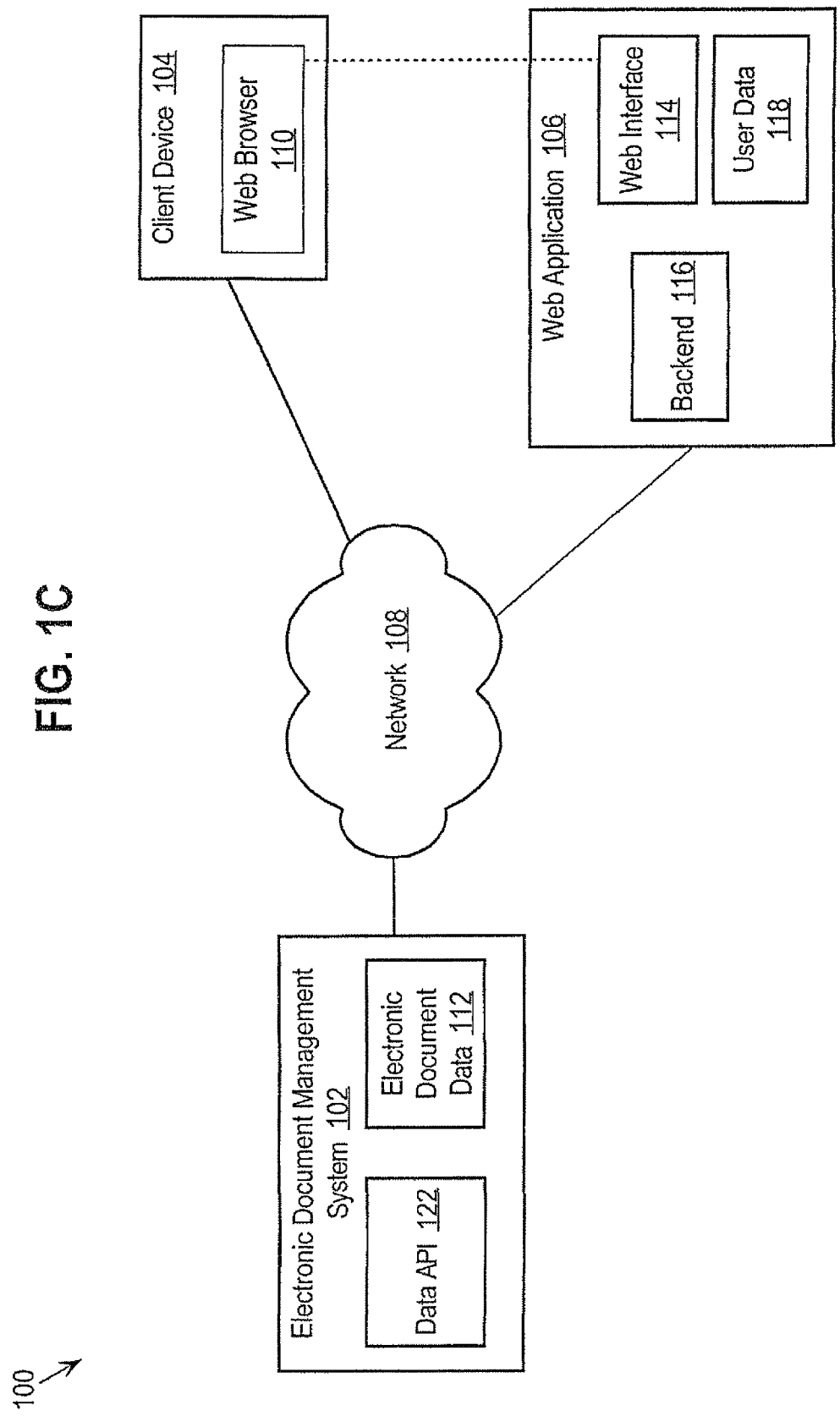
FIG. 1C depicts arrangement in which electronic document management system is implemented separate from a Web application.

As depicted in FIGS. 1A and 1B, Web application 106 and electronic document management system 102 may be hosted on a host system 120, for example a network element such as a server. Embodiments are not limited to electronic document management system 102 and Web application 106 being implemented on a common host 120 however, and electronic document management system 102 and Web application 106 may be implemented separately on different network elements. FIG. 1C depicts arrangement 100 in which electronic document management system 102 is implemented separate from Web application 106. In this example, a user of client device 104 uses Web browser 110 to access Web application 106 via Web interface 114 to construct and submit queries to electronic document management system 102 via backend 116 and data API 122.

III. User Administration and Logging

Figure 2A:
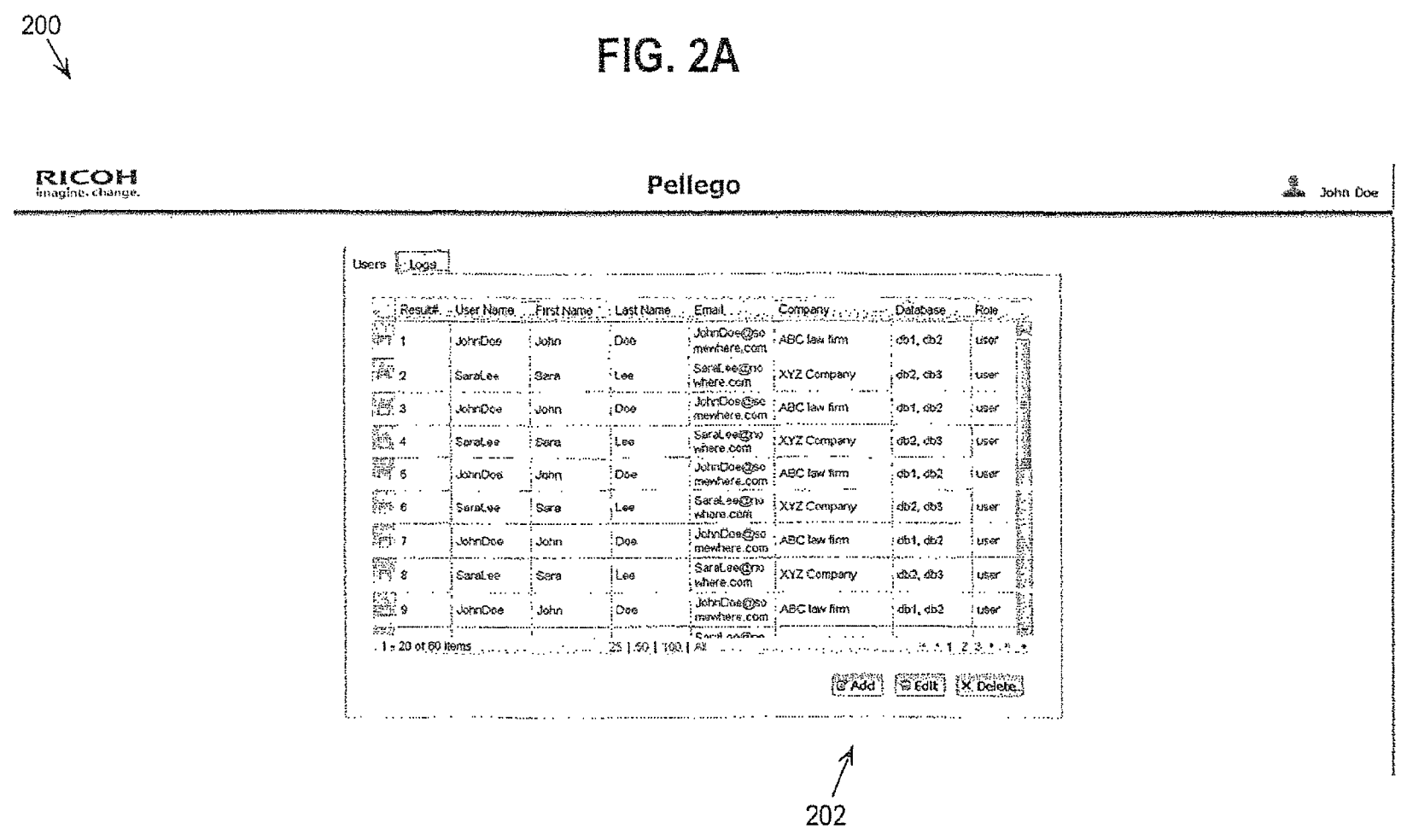

According to one embodiment, Web application 106 is configured to provide different types of administrative user functionality and end user functionality. The particular functionality provided by Web application 106 may vary depending upon a particular implementation and embodiments are not limited to Web application 106 providing particular functionality. FIG. 2A depicts an example user interface 200 generated by Web interface 114 that provides an administrator portal that allows an administrator to manage users and user access rights. The first row of the table depicted in FIG. 2A specifies, for a user named "John Doe", contact information including first and last name and email address, a company affiliation, databases that the user may access and a role for the user. In this example, the databases "db1" and "db2" may be maintained by electronic document management system 102. Although embodiments are described herein in the context of providing user access to databases, embodiments are not limited to databases and are applicable to any form of organized data, such as tables, files, data collections, etc. Example values for the Role attribute include "user" and "admin" and specifying a Role attribute of "admin" may provide access to additional permissions and access rights not depicted in FIG. 2A. User interface 200 includes a set of controls 204 that allow an administrator to add, edit and delete users.

Figure 2B:
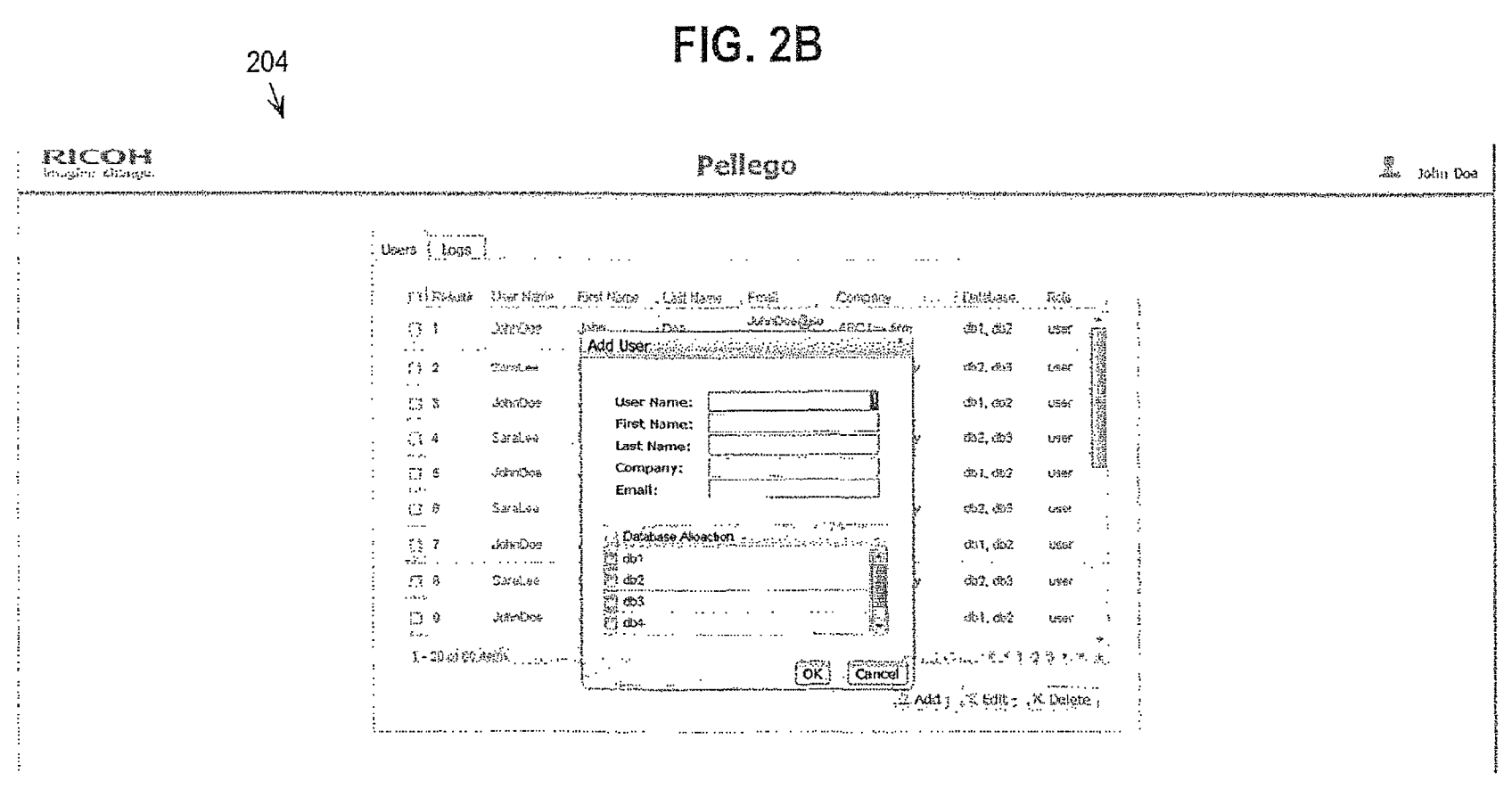

FIG. 2B depicts an example user interface 200 generated by Web interface 114 after an administrative user has selected to add a new user by selecting the "Add" control from controls 202 depicted in FIG. 2A. User interface 200 allows an administrative user to specify, for the new user, a user name, first name, last name, company affiliation and email address. User interface 200 also allows the administrative user to specify databases that the new user is authorized to access.

Figure 2C:
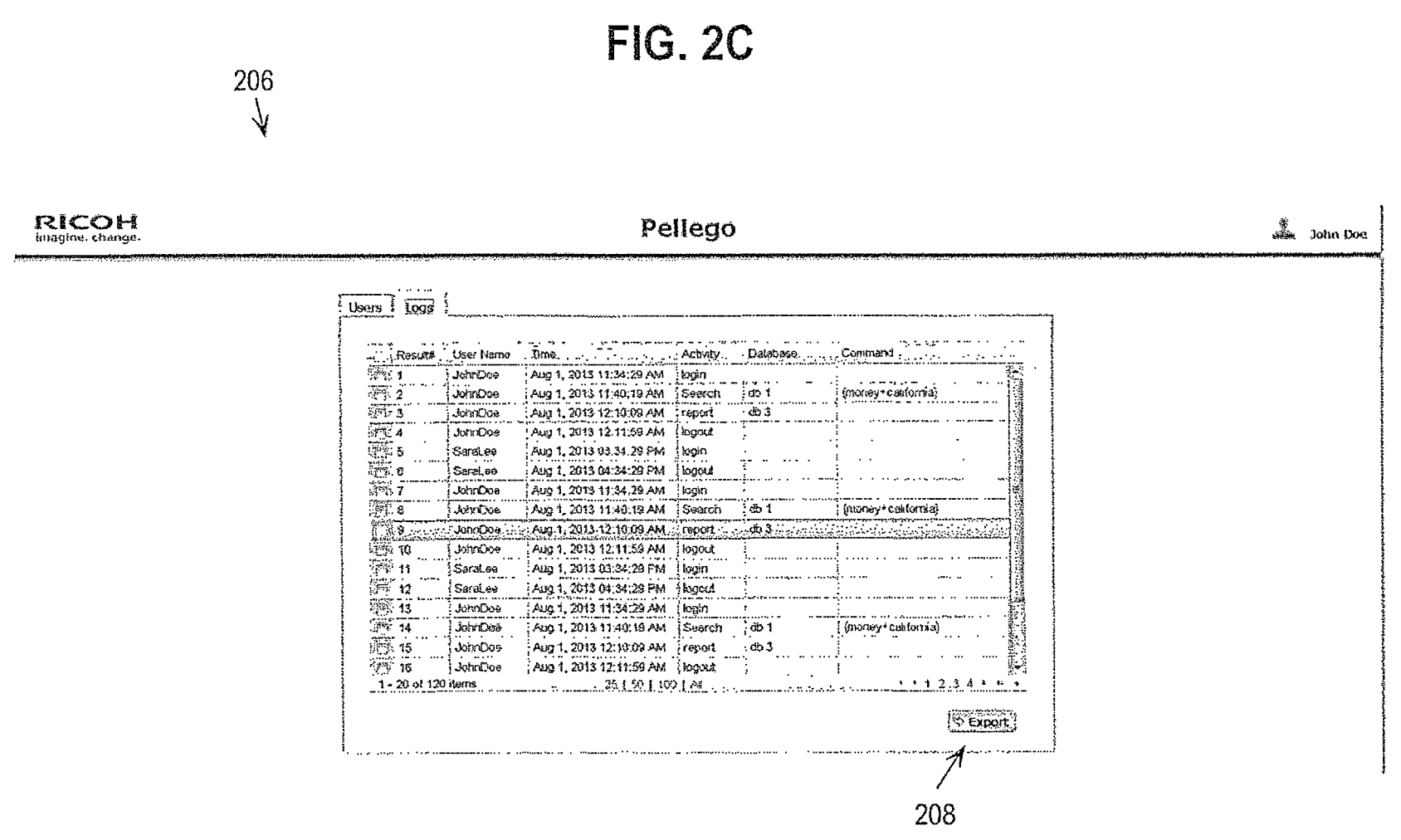

FIG. 2C depicts an example user interface 206 that allows an administrative user to manage logs that track user activity. In the example depicted in FIG. 2C, each row tracks a particular activity that was performed, including the username, the date and time, a type of activity, the data that was accessed, such as a database, and a command that was executed against the data. The logging of user activity may be useful, for example, for auditing purposes. This example also includes a control 208 for exporting log data, for example to a file.

Figure 3:
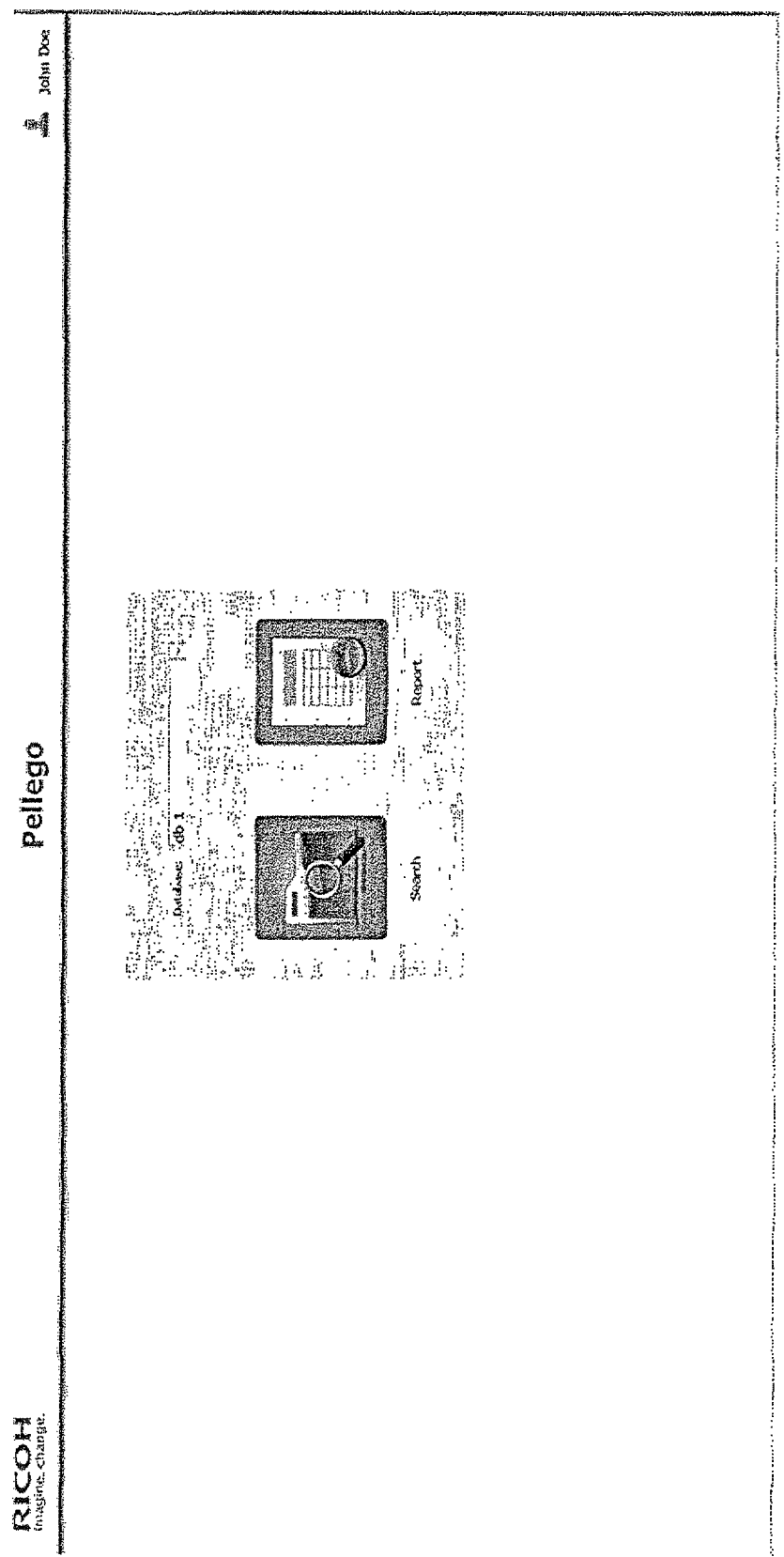
FIG. 3 depicts an example user interface that allows a user to select a particular data set and then select to either search the selected data set or generate a report based upon the selected data set.

FIG. 3 depicts an example user interface 300 that allows a user to select a particular data set, such as a database as depicted in FIG. 3, and then select to either search the selected data set or generate a report based upon the selected data set.

IV. Electronic Document Retrieval

A. Simple Search

The approach described herein provides a user interface and system that allows a user to construct and submit queries for processing against a data collection. According to one embodiment, the user interface is provided by one or more Web pages generated by Web interface 114 that are provided upon request to Web browser 110. The processing of the Web pages provides the Web-based user interface.

Figure 4:
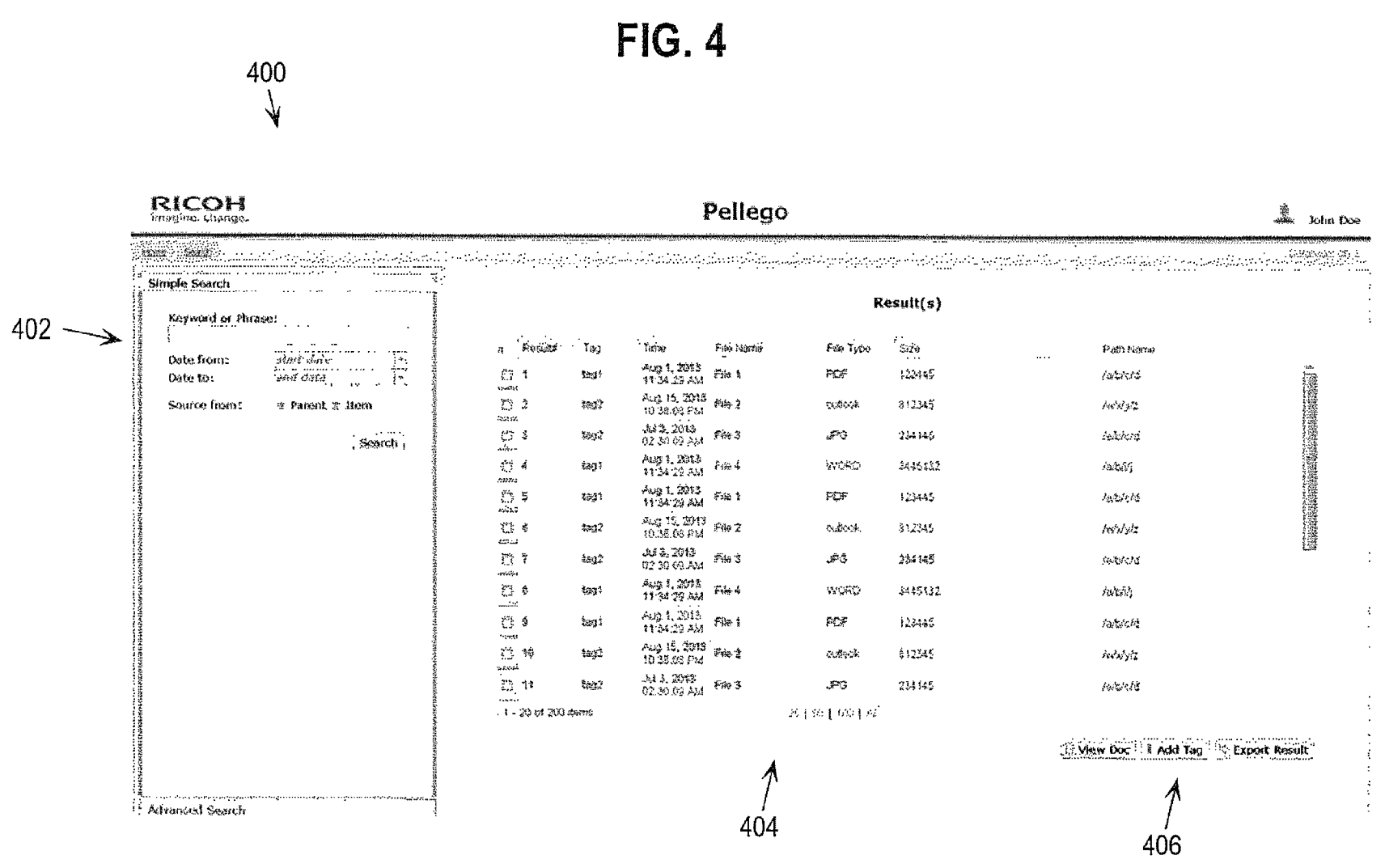

FIG. 4 depicts an example user interface 400 that allows a user to construct and submit for processing, queries for electronic documents. The example user interface 400 depicted in FIG. 4 includes user interface controls 402 for constructing a simple search query. In this example, the controls 402 allow a user to specify one or more keywords or phrases, a starting and ending date, and source of data from either a parent, such as an email, or an item, such as an attachment. Thus, the query may include keywords and phrases, as well as other criteria specified by the user, but the user is not burdened with having to actually write queries, for example, using a structured query language. User interface 400 also includes a results area 404 that displays results of electronic document management system 102 processing the query against electronic document data 112. The table of data displayed in results area 404 may be active, meaning that a user may select columns to cause the data in the results area to be sorted by the selected column. For example, a user may select the "File Name" column to cause the results in results area 404 to be sorted by file name. A user may select one or more result items displayed in results area 404 and then use controls 406 to perform actions on the selected result items. For example, a user may use controls 406 to view a particular electronic document, add a tag to an electronic document or export an electronic document. Selecting the "Add Tag" option allows a user to specify metadata for a search result, for example, via a data entry field that is displayed in response to a user selecting the "Add Tag" option. The metadata may include any type of data. Examples of metadata include, without limitation, notes or comments, categories, topics, subjects, classifications, types, ratings, rankings, indications of relevance, etc. Tag data, i.e., metadata, may be stored by electronic document system 102, either separate from or together with electronic document data 112. Either the tag data itself, or separate data, such as mapping data, may indicate relationships between tag data and electronic document data 112. Tag data may be searchable and according to one embodiment, keywords or phrases included in search queries are processed both against electronic document data 112 and tag data associated with the electronic document data 112.

B. Advanced Search

The approach described herein provides a user interface and system that allows a user to perform an advanced search. The advanced search option allows a user to easily and conveniently construct complex queries and to submit those queries for processing against a data collection. According to one embodiment, a user interface for performing advanced searches is provided by one or more Web pages generated by Web interface 114 that are provided upon request to Web browser 110. The processing of the Web pages provides the Web-based user interface for performing advanced searches. The Web-based user interface allows a user to specify, for inclusion in a query, one or more custodians, file types, domains, Boolean clauses, proximity clauses, keyword phrases, or any combination thereof.

Figure 5A:
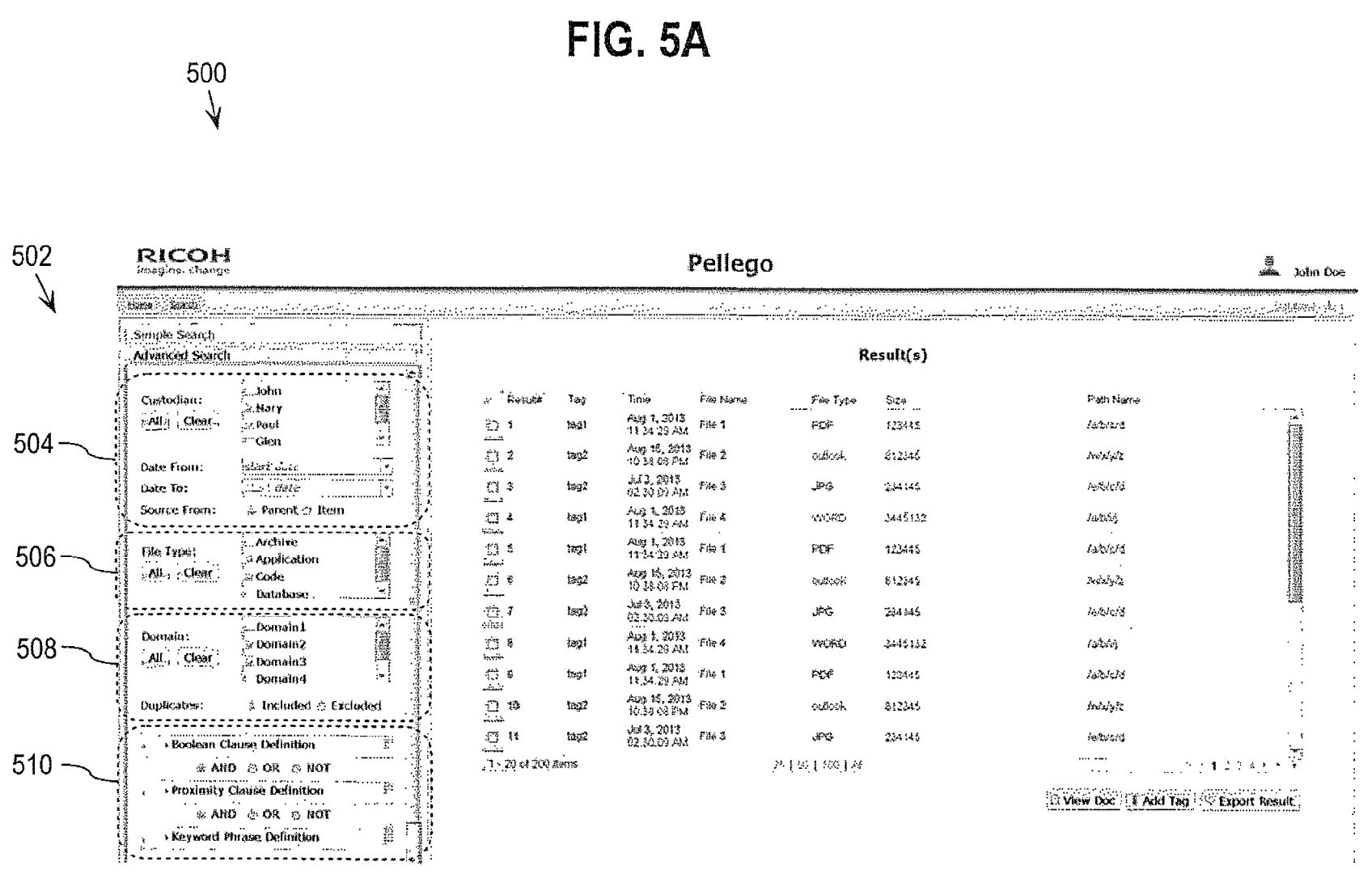

FIG. 5A depicts an example user interface 500 that allows a user to construct and submit for processing, complex queries for electronic documents. The example user interface 500 depicted in FIG. 5 includes various user controls 502 for constructing complex queries. Unlike conventional approaches that require users to have the knowledge and skill to write structured queries, the present approach allows user to construct complex queries by selecting graphical user interface objects that correspond to search constructors, which provides a far more user-friendly experience.

In the example depicted in FIG. 5A, controls 502 include custodian controls 504, file type controls 506, domain controls 508 and Boolean clause/proximity clause/keyword phrase controls 510. Fewer or additional controls may be made available to users depending upon a particular implementation and embodiments are not limited to a user interface with a particular set of controls.

Custodian controls 504 allow a user to select one or more custodians, a date range and a data source. As used herein, a custodian is an entity assigned to a data item. An entity may be a person or a logical entity referred to hereinafter as a "logical custodian". Example logical custodians include, without limitation, an organization, a division, a group, a location, and a role. More than one logical custodian may be assigned to a data item. For example, a business organization, a location, one or more groups or projects, a department, one or more users and one or more roles may be assigned to a data item.

The use of logical custodians can be helpful in performing searches when the person assigned as a custodian is not known. For example, a user searching for a particular data item may not know the person assigned as a custodian to the particular data item. But, the user performing the search may know other logical custodians assigned to the particular data item, or at least likely to be assigned to the particular data item. For example, the user performing the search may know that the person assigned as a custodian is employed by a business organization and more particularly, works on a particular project at a particular location of the business organization. The user performing the search may use one or more of the business organization, the particular project, or the particular location of the business organization as search criteria to help narrow the search for data items of interest. Thus, custodian values used in searches may explicitly be logical custodians and not actual persons or users assigned as custodians. For example, suppose that the user performing the search is searching for design specifications. In this example, the user performing the search may specify the keywords "design specification" as a search term and also use custodian controls 504 to select "Company ABC" and "Project Alpha" as custodians. This will narrow the search to data items that contain the term "design specification" and that also have "Company ABC" and "Project Alpha" as custodians. Thus, even though the user performing the search is not aware of the person or persons who are assigned as custodians of Project Alpha design specifications, the use of logical custodians allows the search to be narrowed and to provide more relevant search results. As another example, the person performing the search may not know the exact identity of the person assigned as custodian, but may know the employment role of the person assigned as a custodian, e.g., that the person assigned as a custodian was a manager on "Project Alpha". In this example, the person performing the search may specify the keywords "design specification" as a search term and also use custodian controls 504 to select "Company ABC" and "Project Alpha" and "Manager" as custodians. This will narrow the search to data items that contain the term "design specification" and that also have "Company ABC" and "Project Alpha" and "Manager" as custodians.

The use of custodians may also be helpful in controlling access to custodian information that may be considered confidential or private. For example, users may be allowed to conduct searches using logical custodians, but not be given access to the identities of the persons assigned as custodians. This allows user to conduct effective searches without revealing the identities of the individuals assigned as custodians. Alternatively, the names of custodians assigned to data items may be included in search results displayed to users on a graphical user interface.

Custodian data may be maintained in a wide variety of formats that may vary depending upon a particular implementation and embodiments are not limited to custodian data being in any particular format. For example, Web application 106 may store custodian data as part of user data 118. FIG. 5B depicts a table 511a that contains example custodian data. In this example, the custodian data includes a custodian user ID and a user name for the person(s) that are the custodian, as well as logical custodian data that includes an employment role (role) of the person(s) who is the custodian, a business organization, a location, a division and a project. The custodian data in each row of table 511a would typically correspond to a data item and data may be maintained that identifies the correspondence between data items and custodian data. The example custodian data in table 511a is depicted as having a single value in each column, but this is done for explanation purposes only and custodian data may include multiple values. For example, while a particular custodian would typically have one username, the particular custodian may have more than one role, business organizations, divisions, locations or projects. Also, data items may have more than one custodian. For example, a particular data item may have as a custodian both a project engineer and the manager of the project. Custodians may be established and maintained by administrative personnel, for example, using an administrative graphical user interface generated by Web application 106. Alternatively, custodians may be established and maintained by client side devices. For example, a user of client device 104 may establish and maintain custodian definitions.

Custodian data may be maintained in a hierarchy, such as the example hierarchy 511b depicted in FIG. 5B. Data may be maintained in custodian data to specify hierarchical relationships, for example, as part of the custodian data in table 511a. The hierarchical data may be used to generate graphical user interface controls to allow a user to select one or more logical custodians. For example, the hierarchical data may be used to generate custodian controls 560 that display selectable logical custodians in a hierarchy, e.g., as depicted by hierarchy 511b, to improve the user experience.

File type controls 506 allow a user to specify one or more file types, for example, archive, application, code or database file types. Any number and types of file types may be used, depending upon a particular implementation, and embodiments are not limited to any particular file types. File types may be established and maintained by administrative personnel, for example, using an administrative graphical user interface generated by Web application 106. Alternatively, file types may be determined and maintained by client side devices. For example, a user of client device 104 may establish and maintain file type definitions, including different categories of file types.

Domain controls 508 allow a user to specify one or more domains, including all domains. A domain is a portion of searchable data. One non-limiting example of a domain is a logical data domain. Logical data domains are useful in a variety of contexts. For example, a business organization may define a set of logical domains, where each logical domain corresponds to a group, project, user or group of users within the business organization. Another non-limiting example of a domain is an email domain. Different domains may share some data items in common, so domain controls 508 include controls for including or excluding duplicates, i.e., data items that are included in more than one domain.

Boolean clause/proximity clause/keyword phrase controls 510 allow a user to specify, using checkboxes, additional criteria to be applied to the advanced search and relationships between those criteria. In the present example, the additional criteria include a Boolean clause, a proximity clause and a keyword phrase. These additional criteria may be selected either individually or in any combination for inclusion in the advanced search. Boolean clause/proximity clause/keyword phrase controls 510 include graphical user interface objects in the form of arrows that allow a user to reveal and hide details for defining Boolean clauses, proximity clauses and keyword phrases. In addition, operators "AND", "OR" and "NOT" may be selected to indicate how the selected Boolean clauses, proximity clauses and keyword phrases are to be used together in the complex query. For example, a user may select to include in the complex query, both a Boolean clause and a proximity clause. The user may also select the "AND" operator to indicate that the search results must satisfy both the Boolean clause and the proximity clause, as further specified as depicted in FIG. 5B hereinafter. Alternatively, the user may select the "OR" operator to indicate that the search results must satisfy either the Boolean clause or the proximity clause, as further specified as depicted in FIG. 5B hereinafter. The "NOT" operator may be selected to add a requirement that search results not include a particular Boolean clause, proximity clause or keyword phrase.

Figure 5C:
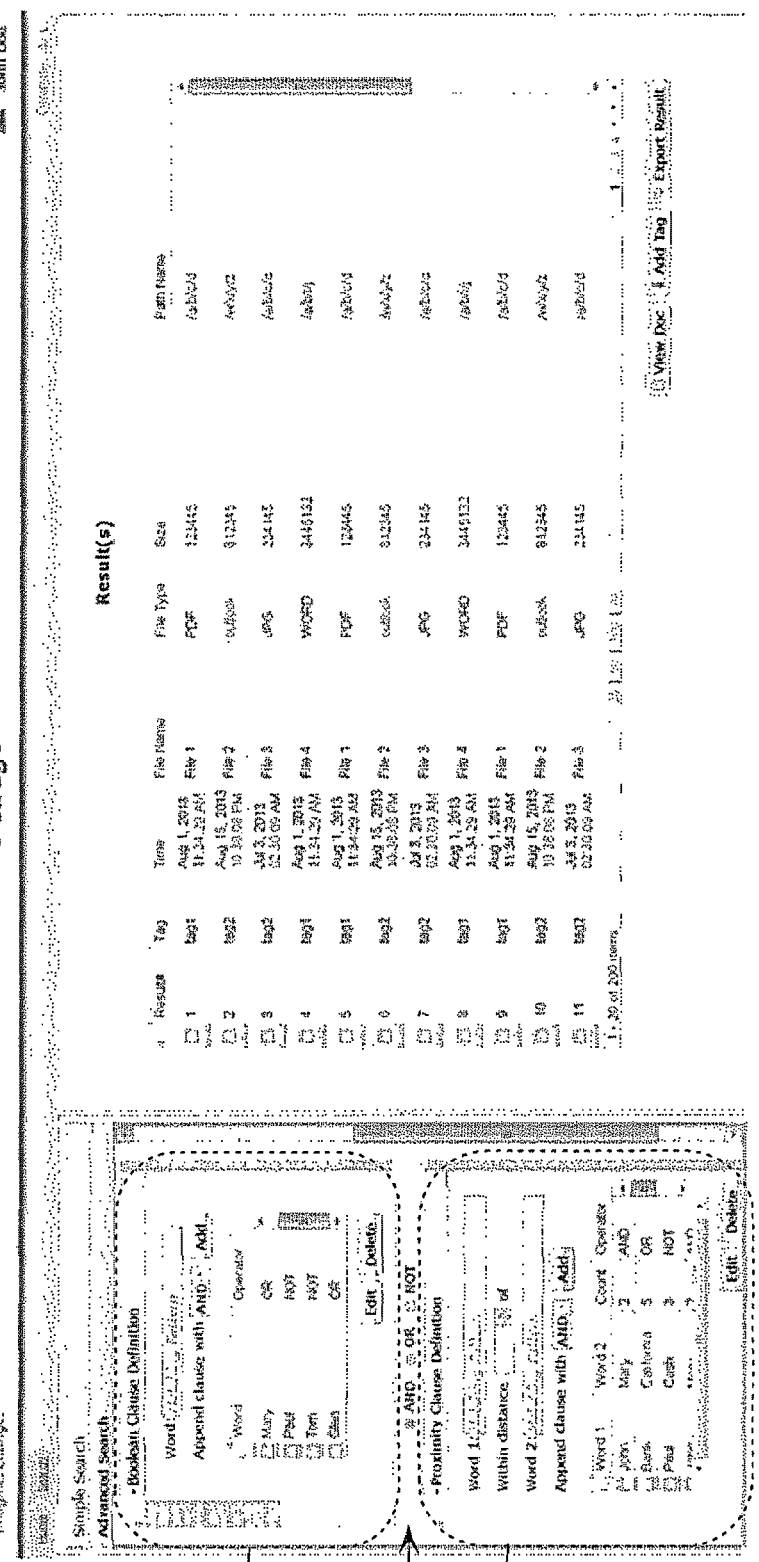
FIG. 5C depicts a user interface with the Boolean clause definition and proximity clause definition options from Boolean clause/proximity clause/keyword phrase controls expanded.

FIG. 5C depicts the user interface 500 with the Boolean clause definition and proximity clause definition options from Boolean clause/proximity clause/keyword phrase controls 510 expanded. Boolean clause definition controls 512 allow a user to define a Boolean clause to be included in an advanced search query by selecting word/operator combinations from a list. For example, a user may select the word/operator combination "Mary/OR" and "Paul/NOT" and the resulting complex query will require that search results include either "Mary" or "Paul". As another example, a user may select the word/operator combination "Mary/OR" and "Paul/NOT" and "Tom/NOT" and the resulting complex query will require that search results include either "Mary" or "Paul" and not "Tom". The Boolean clause definition controls 512 provide a user-friendly approach for users to construct complex queries.

The word/operator combinations that are available in Boolean clause definition controls 512 may be specified by a user, such as an administrator. For example, an administrator may define a set of word/operator combinations that are likely to be of interest to users. The specified word/operator combinations may be user-specific and/or associated with other logical entities, such as groups within a business organization. For example, a set of word/operator combinations may be specified for a particular group of users within a business organization. Although embodiments are depicted in the figures and described herein in the context of word/operator combinations having a one word and one operator, embodiments are not limited to these examples and word/operator combinations may have multiple words and operators. Boolean clause definition controls 512 also allow users to add, edit or delete word/operator combinations by selecting corresponding controls within Boolean clause definition controls 512. This allows users to customize the word/operator combinations made available via Boolean clause definition controls 512. The order in which word/operator combinations are displayed in Boolean clause definition controls 512 may be based upon a wide variety of criteria that may vary depending upon a particular implementation. For example, the order of word/operator combinations may be random, based upon an order in which the word/operator combinations were created, or based upon an order manually specified by a user, such as an administrator.

A first set of Boolean operator controls 514 allows a user to specify how a Boolean clause, defined via Boolean clause definition controls 512, and a proximity clause, defined by proximity clause definition controls 516 will be combined in the complex query.

Proximity clause definition controls 516 allow a user to define a proximity clause to be included an in an advanced search query by selecting one or more word/distance/operator combinations from a list of word/distance/operator combinations. Each word/distance/operator combination includes two search terms, in the form of words, a distance that is identified in the figures by the term "count", and an operator. When a particular word/distance/operator combination is selected, corresponding search attributes are added to the advanced search query and search results must include the two search terms within the specified distance. The distance may be applied on a word-by-word basis, a paragraph-by-paragraph basis, or on other bases, depending upon a particular implementation. For example, suppose that a user selects the first word/distance/operator combination ("John" "Mary" "2" "AND") in the list of proximity clause definition controls 516. Suppose further that the units of distance are words. When this word/distance/operator combination is included in a query, search results must include the term "John" within two words of the term "Mary". As another example, if the units of distance are paragraphs, then search results must include the term "John" within two paragraphs of the term "Mary". The operator "AND" is used to combine the word/distance/operator combination with other search terms, for example with a keyword phrase definition as described hereinafter, and/or other word/distance/operator combinations. For example, suppose that a user selects both the first word/distance/operator combination ("John" "Mary" "2" "AND") and the second word/distance/operator combination ("Bank" "California" "5" "OR") in the list of proximity clause definition controls 516. Suppose further that the units of distance are words. In this situation, the search results must include the term "John" within two words of the term "Mary" and must also include the term "Bank" within five words of the term "California".

As with the word/operator combinations that are available via the Boolean clause definition controls 512, the word/distance/operator combinations available via the proximity clause definition controls 516 may be specified by a user, such as an administrator. For example, an administrator may define a set of word/distance/operator combinations that are likely to be of interest to users. The specified word/distance/operator combinations may be user-specific and/or associated with other logical entities, such as groups within a business organization. For example, a set of word/distance/operator combinations may be specified for a particular group of users within a business organization. In addition, although embodiments are depicted in the figures and described herein in the context of word/distance/operator combinations having a one word and one operator, embodiments are not limited to these examples and word/distance/operator combinations may have multiple words and operators.

Proximity clause definition controls 516 also allow users to add, edit or delete word/distance/operator combinations by selecting corresponding controls within proximity definition controls 516. This allows users to customize the word/distance/operator combinations made available via proximity clause definition controls 516.

Figure 5D:
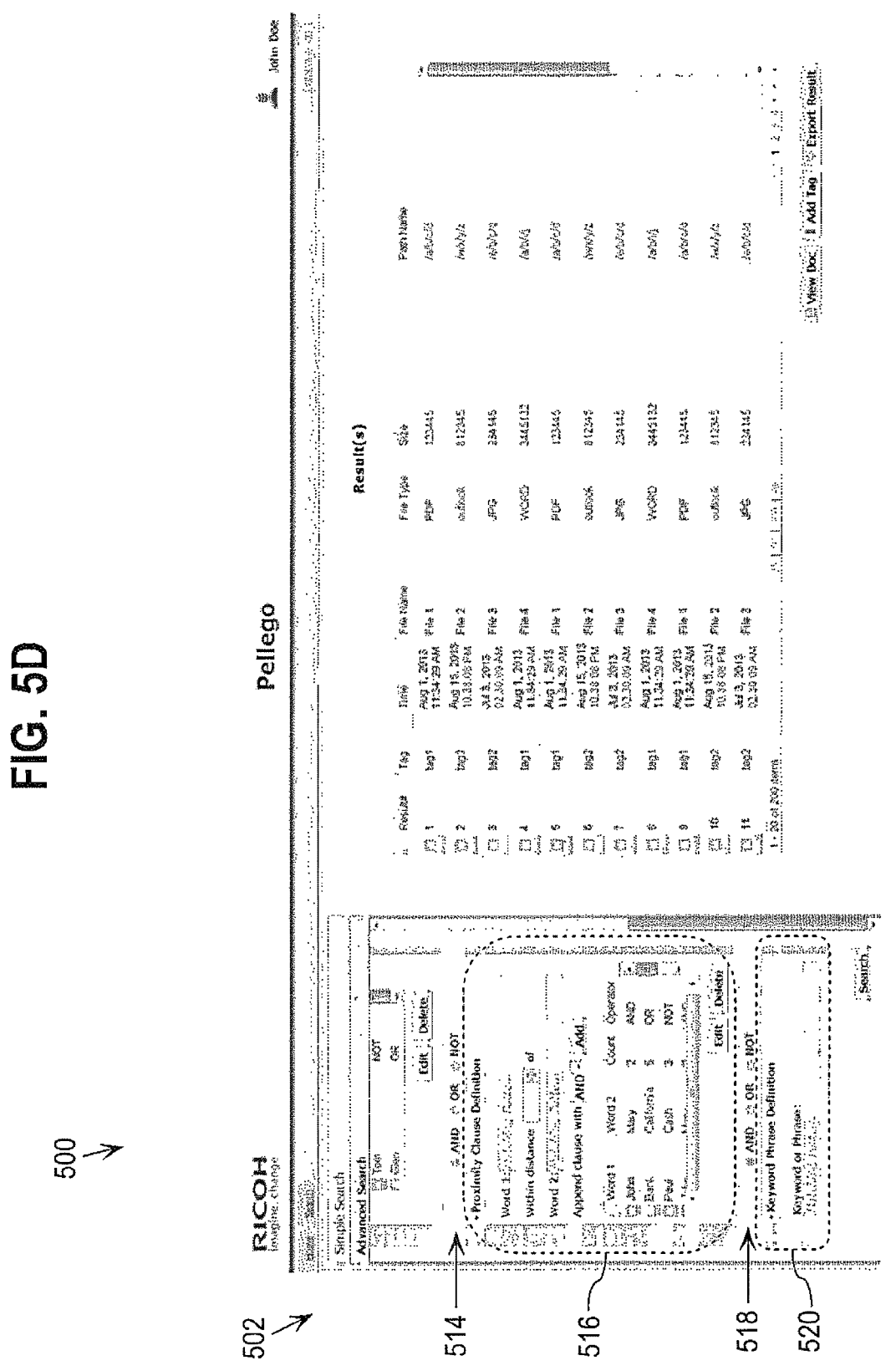

As depicted in FIG. 5D, a second set of Boolean operator controls 518 allows a user to specify how a keyword phrase definition, defined by keyword phrase definition controls 520, will be combined in the complex query with a Boolean clause, defined via Boolean clause definition controls 512, and a proximity clause, defined by proximity clause definition controls 516. Keyword phrase definition controls 520 allow a user to specify one or more keywords and/or phrases that are to be included in and used as search query terms in a complex query. For example, a user may choose to specify a particular keyword to be included in the complex query by selecting the "AND" operator from the second set of Boolean operator controls 518. The particular keyword may be related to a particular context that the user believes to be relevant for the search. In this example, the search results must include the particular keyword since the "AND" operator was selected from the second set of Boolean operator controls 518.

C. Semantic Meanings

Figure 5E:
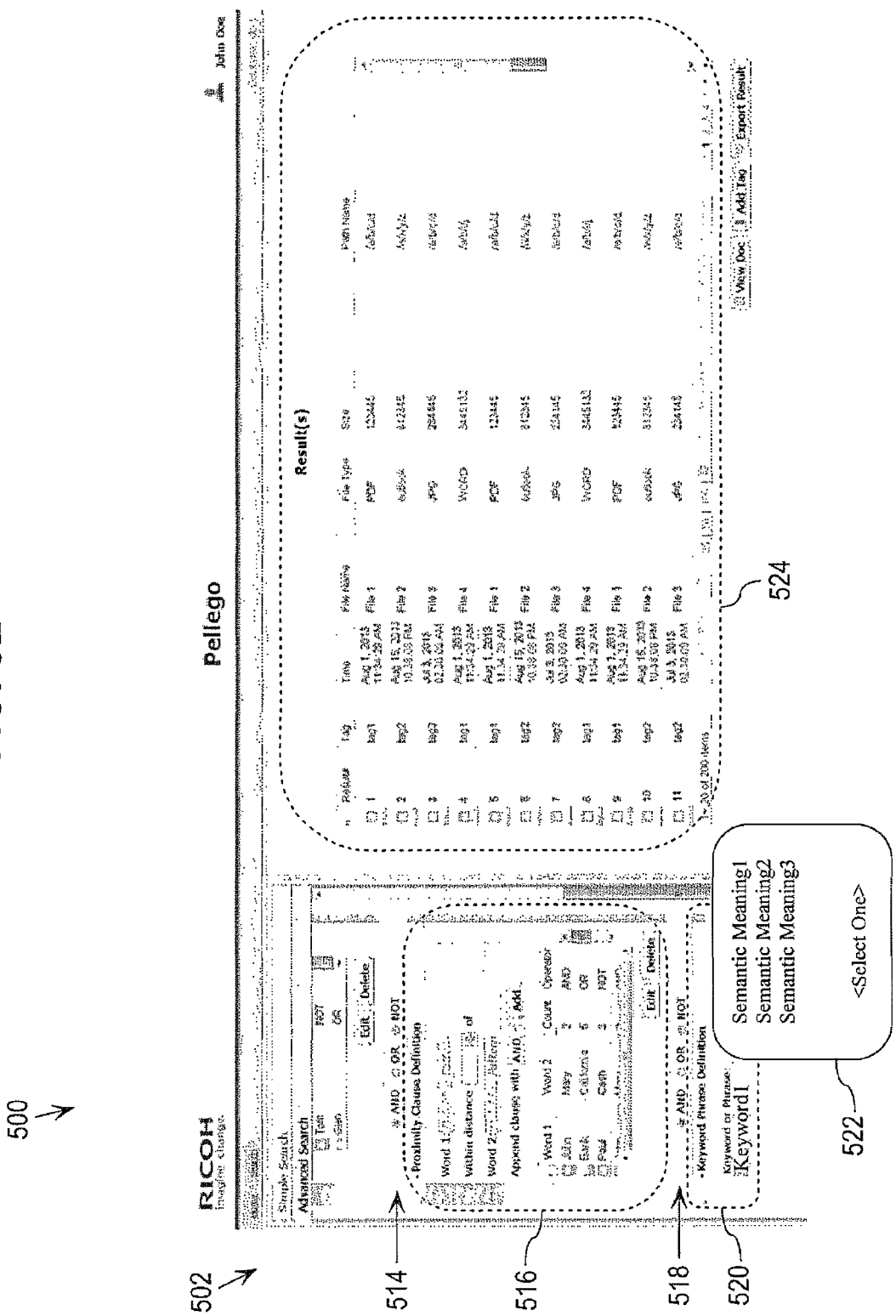
FIG. 5E depicts user interface after a user has entered a keyword via keyword phrase definition controls.

Keywords and phrases used in search queries may have different semantic meanings that can reduce the relevancy of search results. According to an embodiment, an option is provided that allows users to specify or select a semantic meaning for keywords and phrases used in search queries. FIG. 5E depicts user interface 500 after a user has entered, via keyword phrase definition controls 520, a keyword "Keyword1" to be included in a complex query. A semantic meaning box 522 is displayed that identifies different semantic meanings for the keyword "Keyword1". In this example, three semantic meanings are displayed, identified as "Semantic Meaning1", "Semantic Meaning2" and "Semantic Meaning3". The semantic meanings may be retrieved from a database of keywords and corresponding semantic meanings. The number of semantic meanings and the manner in which semantic meanings are displayed on a graphical user interface may vary depending upon a particular implementation and embodiments are not limited to any particular implementation.

The semantic meaning box 522 allows a user to select one or more of the semantic meanings for the keyword and have the complex query modified to represent the selected semantic meaning. The modification of the complex query to represent the selected semantic meaning may be performed using a wide variety of approaches that may vary depending upon a particular implementation. For example, a selected semantic meaning may be added to a complex search query. As another example, search terms or keywords that correspond to a selected semantic meaning may be added to a complex search query. This may improve the relevancy of search results because the complex search query is modified to reflect the one or more semantic meanings selected by the user.

Semantic meanings may also be used to improve the usefulness of search results. For example, in FIG. 5E, search results are presented in a results area 524. According to one embodiment, the table of search results depicted in results area 524 includes a column that indicates semantic meanings for the search results. This may improve the relevancy of the search results and the user experience for a user. For example, suppose that a user constructed a complex query using the query term "Server Farm" and did not specify a semantic meaning, e.g., related to the information technology context. In this example, the search results may include results related to information technology as intended by the user. The search results may, however, include results for other contexts that are not of interest to the user, e.g., in the agriculture context.

According to one embodiment, semantic meanings may be used to organize and order search results. For example, a user selection of a graphical user interface object that corresponds to a particular semantic meaning causes the data displayed in the table to be re-ordered based upon the particular semantic meaning. This can improve the relevancy of the results and the user experience by allowing a user to re-order search results based upon a context of interest to the user. The use of semantic meanings to re-order search results may be used separately or in combination with the use of semantic meanings when constructing complex search queries. For example, in situations where a user does not specify a particular semantic meaning during construction of a complex query, then the search results may include many different semantic meanings and the use of semantic meanings to re-order search results as described herein may be very useful for improving relevancy and the user experience. In other situations where a user specifies multiple semantic meanings when constructing a complex search query, then the use of semantic meanings to re-order search results as described herein may still be very useful for improving relevancy and the user experience. Even in situations where a user specifies one or more semantic meanings when constructing a complex search query, the use of semantic meanings to re-order search results as described herein may still be helpful in situations where sub-categories of semantic meanings are applicable to search results and may not have been made available to the user at the time the complex search query was constructed.

D. Intelligent Advanced Search

As previously described herein, the approach described herein provides a user interface and system that allows a user to perform simple and advanced searches. While the simple search includes a user-friendly and effective graphical user interface, in some situations a simple search may result in a large number of search results that may be time consuming to review. The advanced search option allows a user to easily and conveniently construct complex search queries that may provide a smaller and more focused set of search results that is easier to review.

To further enhance the flexibility and user-experience, an intelligent advanced search option is provided that automatically constructs an advanced search based upon the results of a simple search. The search terms of the advanced search query are automatically determined based upon the set of search results from a simple search performed by the user. The graphical user interface controls for the advanced search are automatically pre-selected/populated to match the constructed advanced search query. The user may then use the graphical user interface to modify the search terms of the advanced search query and reduce the number of search results. This approach enhances the user experience by automatically constructing the advanced search query and pre-selecting/populating the graphical user interface controls to provide a starting point for the user to then reduce the set of search results. This may provide a more favorable user experience by reducing the burden on users to select the options for an advanced search.

FIG. 5F is a flow diagram 530 that depicts an approach for performing an intelligent advanced search according to an embodiment. In step 532, a user performs a simple search, for example, as described herein and depicted in FIG. 4. For example, FIG. 5G is a block diagram that depicts an example graphical user interface (GUI) 550 for performing a simple search. GUI 550 includes controls 552 that allow a user to specify one or more keywords to be used for the simple search. In the present example, a user has entered "United States" as a query term. Controls 552 also allow a user to specify a date range and a source and to initiate a simple search via a "Search" button. The simple search query is generated and processed against a plurality of data items to generate a first set of search results. For example, Web application 106 may cause the simple search query to be processed against electronic document data 112 stored in electronic document management system 102 and the search results to be returned to client device 104.

In step 534, search results from the simple search are presented to the user. For example, GUI 550 includes search results 554 that in the present example include ten files having the file names "File 1" through "File 10". The search results 554 also indicate, for each file, a corresponding tag, a file type, a custodian and a domain. The search results 554 may include other attributes for the files that are not necessarily displayed on GUI 550, depending upon a particular implementation.

In step 536, the user invokes the intelligent advanced search, for example, by selecting an "Advanced Search" control 556 or an "Intelligent Advanced Search" control (not depicted). Thus, the intelligent advanced search may be automatically invoked when a user invokes an advanced search immediately after performing a simple search. Alternatively, the user may invoke the intelligent advanced search by selecting a specific graphical user interface control associated with the intelligent advanced search.

In step 538, in response to the user's request to perform an advanced search, an advanced search query is automatically constructed and in step 540, is presented to the user via GUI 550. Also, the advanced search graphical user interface controls are pre-selected/populated to correspond to the constructed advanced search query. According to one embodiment, the advanced search query is constructed based upon attributes of the set of search results. In the present example, all of the files in the search results 554 have a file type of "Type 1", "Type 2" or "Type 3", a custodian of "C1", "C2" or "C3" and a domain of "D1", "D2" or "D3". Thus, an example advanced query in a generic form is:

"United States" AND (FileType=Type 1 OR Type 2 OR Type 3) AND (Custodian=C1 OR C2 OR C3)"

Figure 5H:
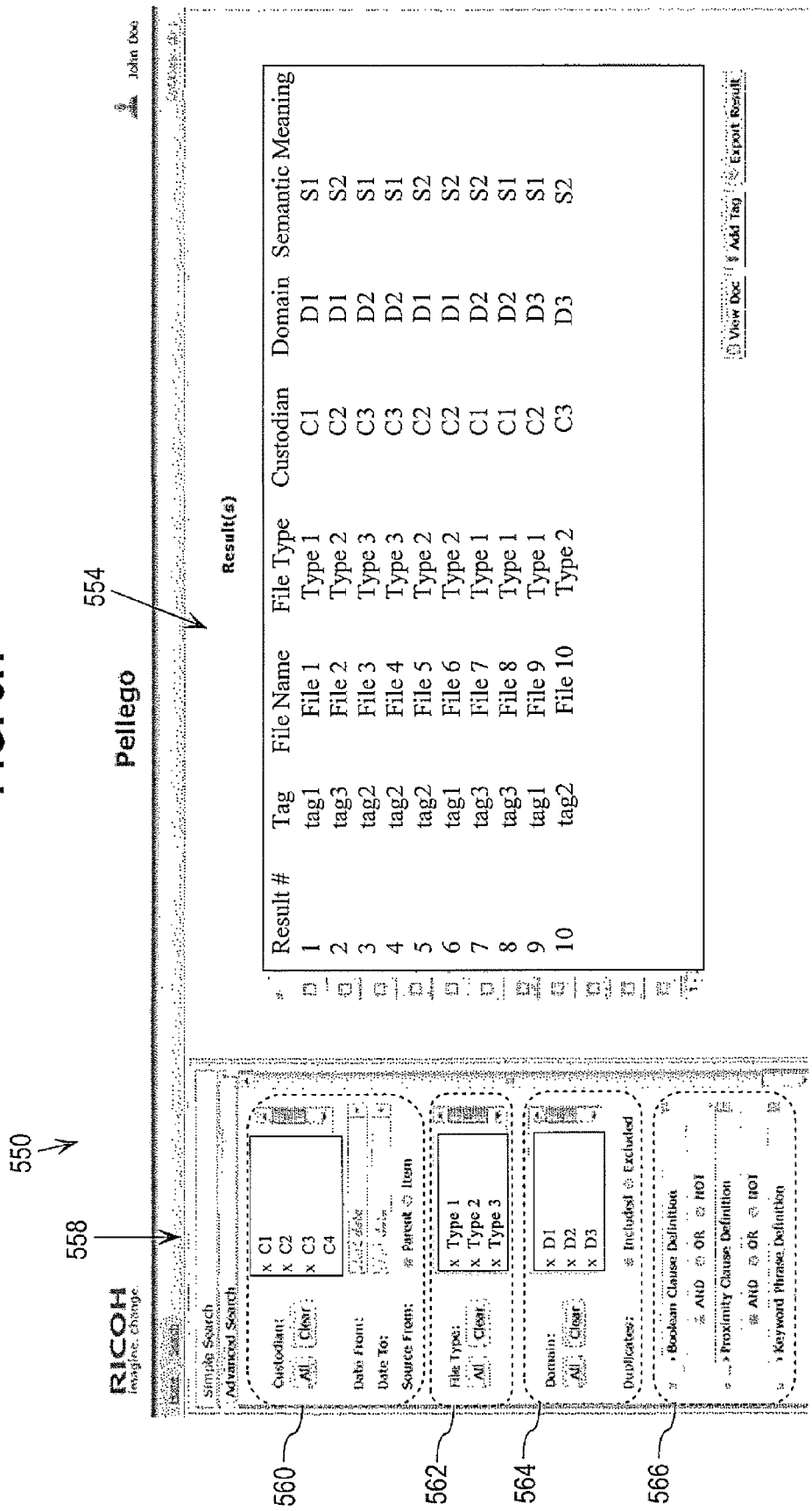
FIG. 5H depicts an advanced search query that has been presented to the user via a graphical user interface.

As depicted in FIG. 5H, the advanced search query is presented to the user via GUI 550 and the advanced search graphical user interface controls are pre-selected/populated. For example, FIG. 5H depicts GUI 550 after a user has selected the "Advanced Search" control 556 to invoke the intelligent advanced search according to an embodiment. In this example, GUI 550 includes advanced search controls 558 that are pre-selected/populated with the advanced search query that was automatically constructed. In the present example, custodian controls 560 are pre-selected to match the search results 554. In particular, custodians C1, C2 and C3 are selected, as indicated by the "x" next to each custodian identifier, since the search results 554 all have a corresponding custodian of C1, C2 or C3. Custodian C4, and other custodians accessible via the slider control, are not pre-selected, since none of the search results 554 have a corresponding custodian of C4. Similarly, file type controls 562 are also pre-selected to match the search results 554. In particular, file types Type 1, Type 2 and Type 3 are selected, as indicated by the "x" next to each file type identifier, since the search results 554 all have a corresponding file type of Type 1, Type 2 or Type 3. Other file types are accessible via the slider control, are not pre-selected, since none of the search results 554 have any other file types. Domain controls 564 are pre-selected to match the search results 554. In particular, domains D1, D2 and D3 are selected, as indicated by the "x" next to each domain identifier, since the search results 554 all have a corresponding domain of D1, D2 or D3. Other domains are accessible via the slider control, are not pre-selected, since none of the search results 554 have any other domains.

Once the advanced search query has been presented to the user via GUI 550 as depicted in FIG. 5H, in step 542, the user may quickly and easily reduce the number of search results in search results 554 using the graphical user interface controls 558. For example, as depicted in FIG. 5I, a user has de-selected the search results attribute custodian "C3" using custodian controls 560. In response to detecting the user selection of the graphical user interface controls 558, GUI 550 is automatically updated. In the present example, Results #3, 4 and 10 are removed from the search results 554, as indicated by the strikethrough, since Results #3, 4 and 10 all share the search results attribute custodian "C3". The use of strikethrough is provided for illustration purposes only and GUI 550 may be updated in any manner to reflect the change made by the user to the graphical user interface controls 558. As one non-limiting example, Results #3, 4 and 10 may be removed from GUI 550. As can be seen from this example, the intelligent advanced search provides a user friendly and intuitive approach for reducing the number of search results obtained via a simple search. This may be particularly useful in situations where a user has used a broad search query for a simple search, or where there is a large amount of data against which the simple search is performed. Note that the advanced search query does not have to be processed against the plurality of data items. The search results displayed on GUI 550 can be updated, e.g., reduced, in response to a user de-selecting one or more of the GUI controls 558. This is not prohibited, however, and the advanced search query may be processed against the plurality of data items, depending upon a particular implementation.

The intelligent advanced search may also include the use of semantic meanings. As depicted in FIGS. 5G and 5H, search results 554 include a semantic meaning, having a value of "S1" or "S2" in the present example. Graphical user interface controls 558 may allow a user to de-select one or more semantic meaning values to narrow search results 554. For example, given that all of the search results 554 have a semantic meaning of "S1" or "S2", the user may de-select "S1" or "S2" to reduce the number of search results.

In additional to pre-selecting/populating the custodian controls 560, file type controls 562 and domain controls 564, the approach may also include pre-selecting/populating a proximity clause definition via controls 566. As previously described herein, a proximity clause definition defines a set of search terms, such as words, and their proximity within the search results. For example, a proximity clause definition may specify the word "United" within a distance of two words of "States". According to one embodiment, a proximity clause definition is pre-selected/populated based upon an analysis of the search results to identify candidate proximity clause definitions that are satisfied by the search results. For example, a valid pre-selected/populated proximity clause definition of "United" within two words of "States" would need to appear in each of the search results 554. More than one pre-selected/populated proximity clause definitions may be determined and presented to the user via GUI 550 and the user may de-select one or more of the pre-selected/populated proximity clause definitions to reduce the number of search results 554. For example, a list of candidate proximity clause definitions may be presented in a list displayed on GUI 550 and a user may select one or more of the candidate proximity clause definitions. Candidate proximity clause definitions may be ranked and displayed to a user in a ranked order. Candidate proximity clause definitions may be ranked based upon a wide variety of criteria that may vary depending upon a particular implementation. According to one embodiment, candidate proximity clause definitions are ranked based upon content in search results. Content contained in search results may be ranked and candidate proximity clause definitions may be ranked based upon the corresponding ranking of the content from which the candidate proximity clause definitions were determined. For example, suppose that a particular search result document includes content A and content B. Suppose further that content A has a first ranking and content B has a second ranking. Candidate proximity clause definitions determined based upon content A may be assigned a ranking based upon the first ranking assigned to content A and candidate proximity clause definitions determined based upon content B may be assigned a ranking based upon the second ranking assigned to content B. Users may also specify their own proximity clause definitions to narrow search results. For example, after completing a simple search and selecting the intelligent advanced search option, the user is presented with candidate proximity clause definitions that are known to exist in the search results that were generated by the simple search. The user may de-select one or more of the candidate proximity clause definitions to broaden (increase) the search results. This is because all of the candidate proximity clause definitions are satisfied by the search results and removing (de-selecting) one or more of the candidate proximity clause definitions removes a restriction on the search results. Alternatively, the user may specify their own proximity clause definition that may narrow (decrease) the search results, depending upon how many of the search results satisfy the user-specified proximity clause definition.

V. Reporting

A. Reporting Functionality

Figure 6A:
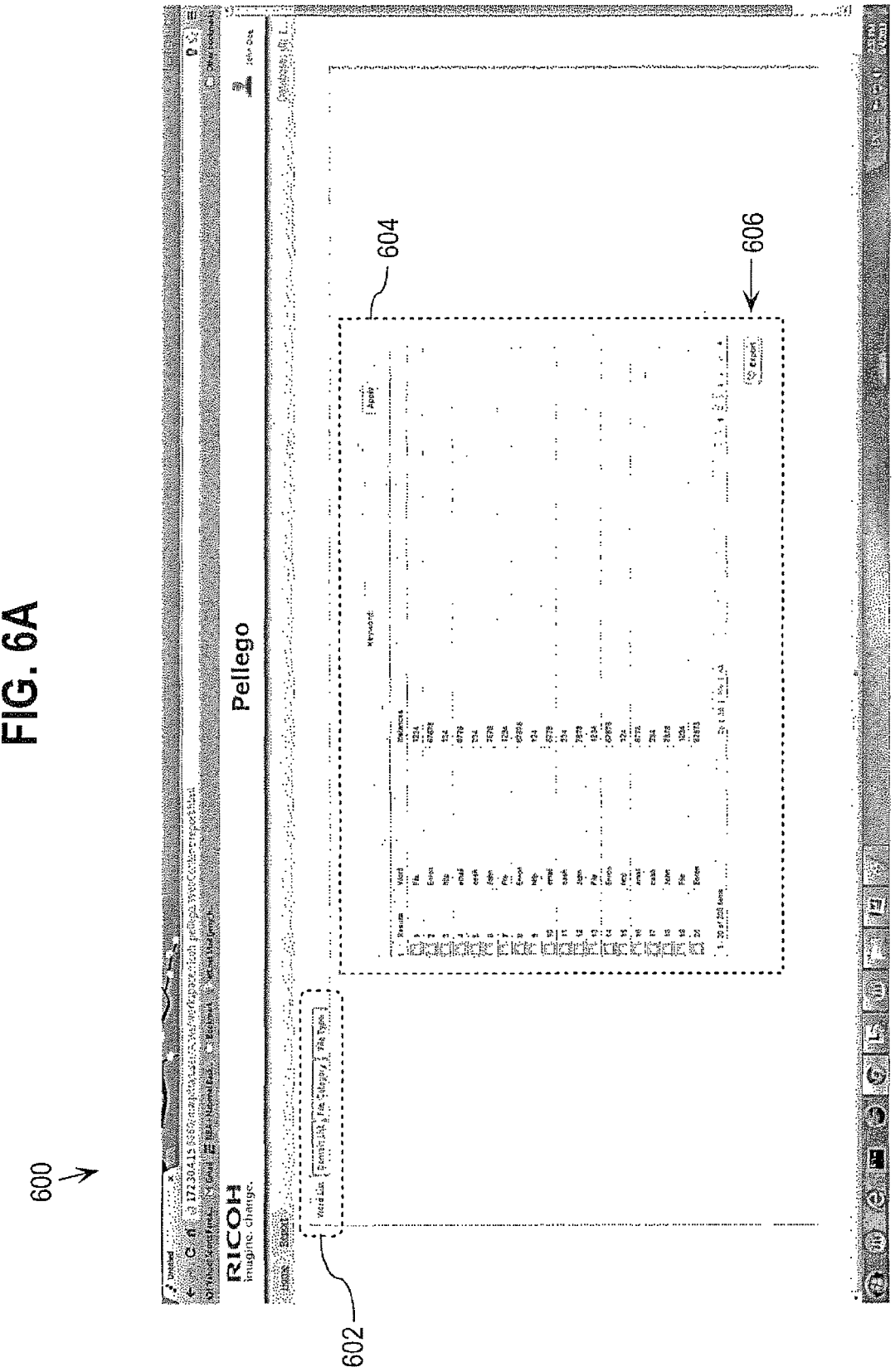
FIG. 6A depicts a user interface that provides user access to various types of reporting functionality via a set of reporting controls.

The system herein for providing electronic document retrieval and reporting may include various types of reporting functionality. FIG. 6A depicts a user interface 600 that provides user access to various types of reporting functionality via a set of reporting controls 602. In this example, reporting controls 602 are depicted as a set of user-selectable tabs which, when selected, cause the display of different reporting screens within user interface 600. The user-selectable tabs include "Word List", "Domain List", "File Category" and "File Type". The particular user-selectable tabs depicted in the figures are provided for information purposes only and embodiments are not limited to these example user-selectable tabs. FIG. 6A depicts the "Word List" tab that includes statistics 604 for a set of search results. In this example, the statistics 604 include a list of words and a number of times (instances) that each of those words appears in the set of search results. A control 606 allows data depicted in FIG. 6A to be exported, for example, to a file.

Figure 6B:
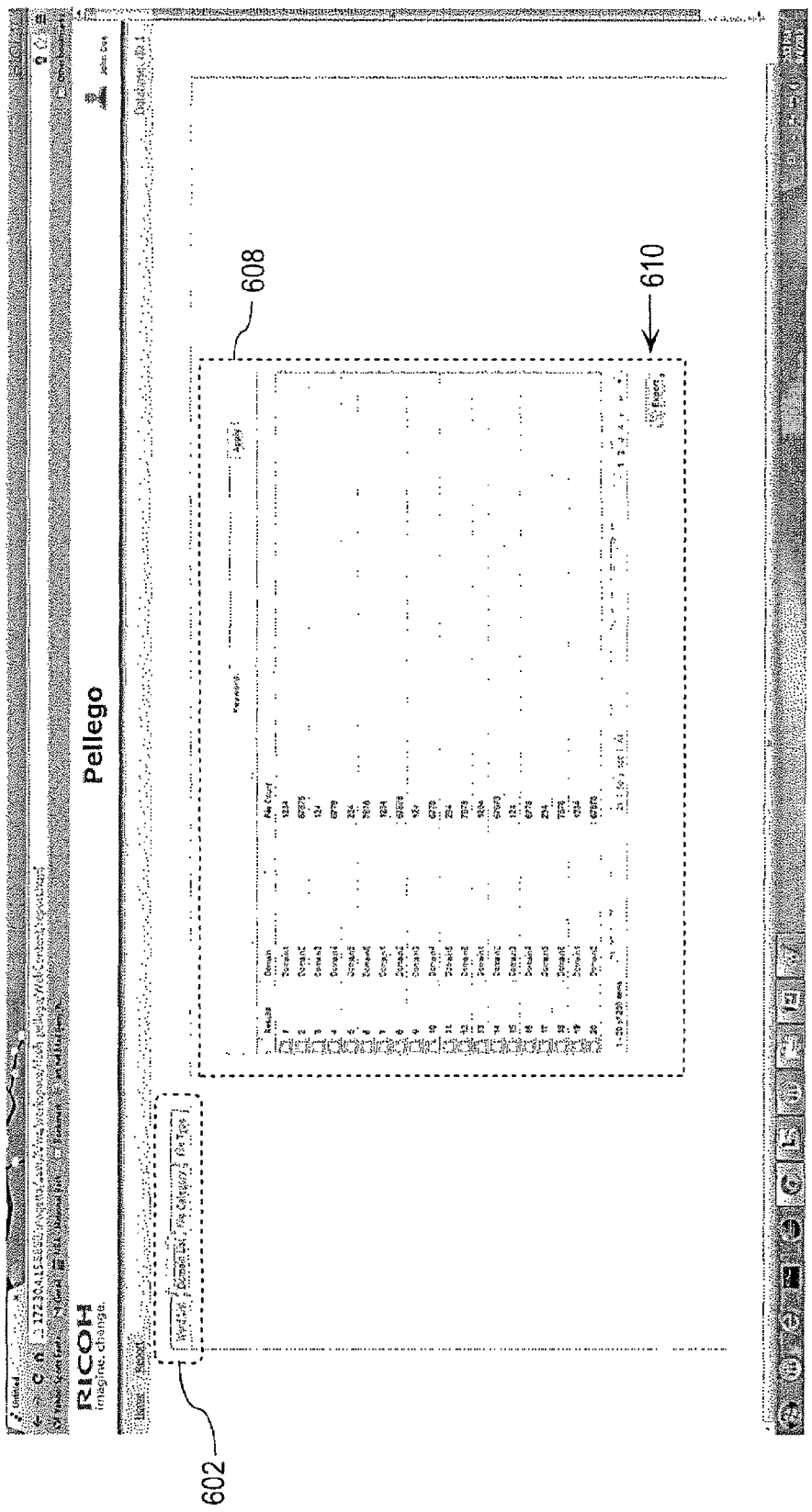
FIG. 6B depicts the "Domain List" tab that includes statistics for a set of search results.

FIG. 6B depicts the "Domain List" tab that includes statistics 608 for a set of search results. In this example, the statistics 608 include a list of data domains and a file count for each data domain for the search results, i.e., a number of files in each data domain. A control 610 allows data depicted in FIG. 6B to be exported, for example, to a file.

Figure 6C:
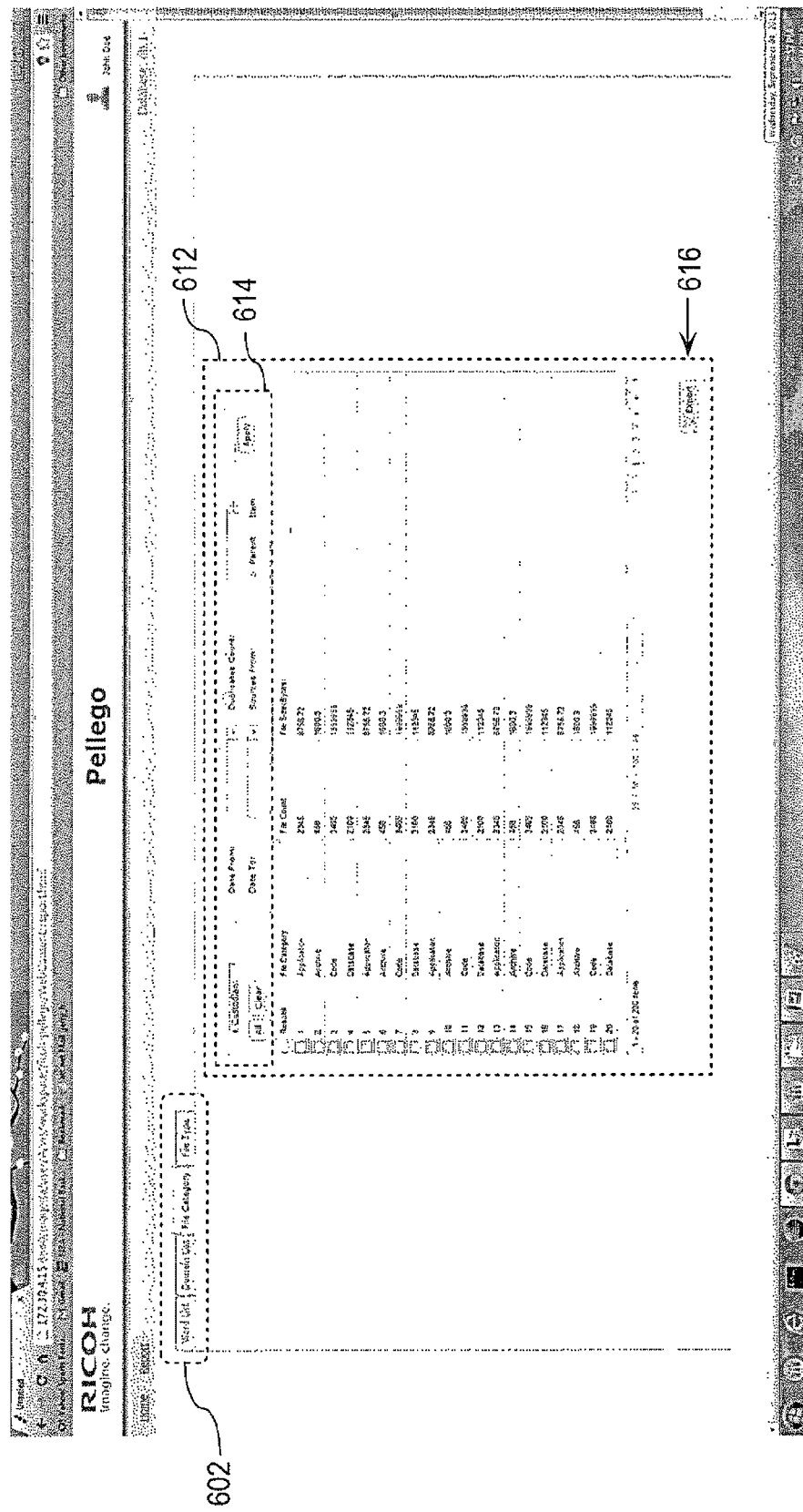
FIG. 6C depicts the "File Category" tab that includes statistics for a set of search results.
Figure 6D:
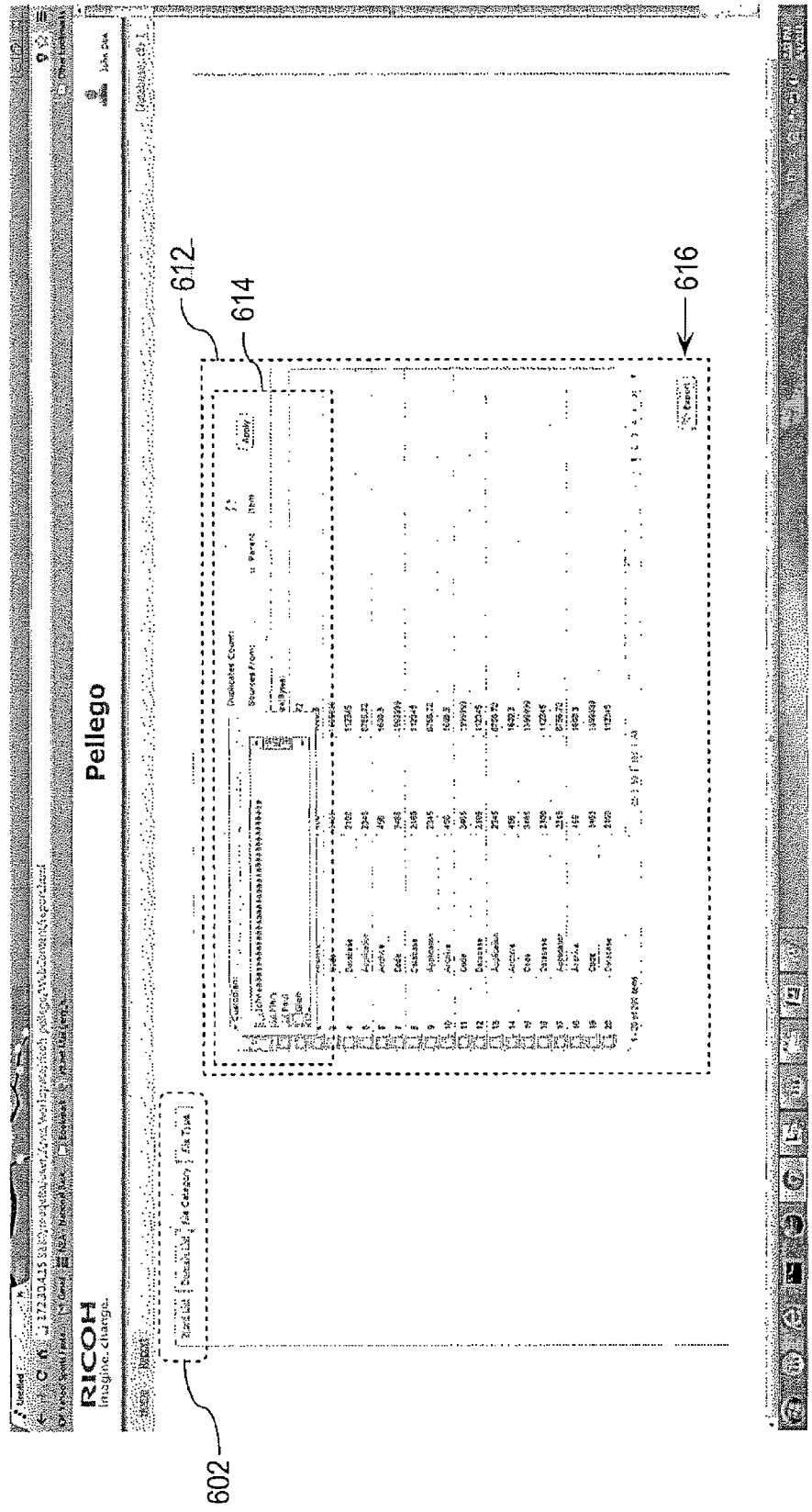
FIG. 6D depicts example filter criteria.

FIG. 6C depicts the "File Category" tab that includes statistics 612 for a set of search results. In this example, the statistics 612 include a list of file categories and a file count and file size (average) for each file category for the search results, i.e., a number of files and a file size (average) for each file category. A set of filter controls 614 allows a user to specify filter criteria to be applied to the statistics 612. The filter criteria include one or more custodians, including logical custodians, as depicted in FIG. 6D, a date range, a duplicate count to reduce duplicates and a data source (parent/item). For example, a user may select to filter the search results by a particular logical custodian to improve the relevancy for a particular context. Suppose that a user is interested in search results that have a corresponding custodian that worked on a particular project, because the user does not know the exact identity of the custodian. The user may use filter controls 614 to select the particular project as a logical custodian to reduce the search results to search results that have a corresponding logical custodian of the particular project. Filter controls 614 allow a user to narrow the search results and the corresponding statistics 612 displayed on user interface 600. Application of the filter criteria may be implemented by a user selecting the "Apply" button displayed in filter controls 614. A control 616 allows data depicted in FIG. 6C to be exported, for example, to a file.

Figure 6E:
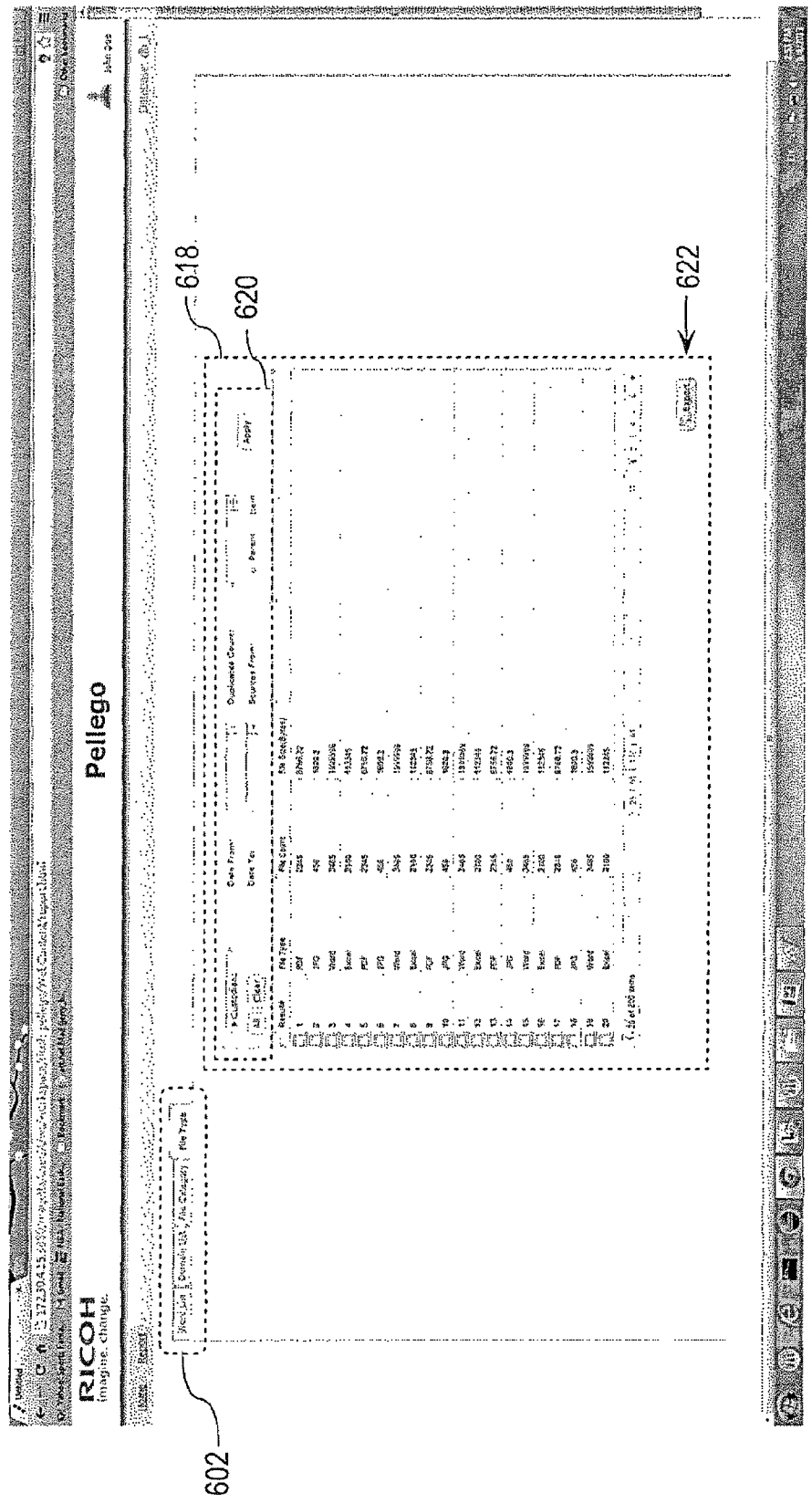
FIG. 6E depicts the "File Type" tab that includes statistics for a set of search results.

FIG. 6E depicts the "File Type" tab that includes statistics 618 for a set of search results. In this example, the statistics 618 include a list of file types and a file count and file size (average) for each file type for the search results, i.e., a number of files and a file size (average) for each file type. A set of filter controls 620 allows a user to specify filter criteria to be applied to the statistics 618. The filter criteria include one or more custodians, including logical custodians, a date range, a duplicate count to reduce duplicates and a data source (parent/item). A control 622 allows data depicted in FIG. 6E to be exported, for example, to a file. The particular search results attributes displayed on user interface 600 may vary depending upon the type of search performed. For example, the search results displayed on user interface 600 for a simple search may include fewer search results attributes than when the results of an advanced search are displayed.

Statistics for search results may be graphed. For example, a user may select to graph search results displayed in the "File Type" or "File Category" tabs described herein. In some situations, graphing can be made less useful to users due to the presence of a large number of data items that have statistically insignificant value, but that are included in the graph. For example, suppose that statistics include the number of occurrences of each of a plurality of tags and there are some tags with a large number of occurrences and also a large number of tags with a very small number of occurrences, e.g., one or two. A line graph that depicts the number of occurrences by tag may include a large tail that is not particularly useful to users. As another example, a pie chart may include a large number of narrow slices that do not visually convey meaningful information to users and similarly, a bar graph may have bars that are too small to convey meaningful information to users.

According to one embodiment, a maximum number of results are displayed. For example, data for up to a maximum number of tags is displayed and data for other tags may be group together in an "other" category. As another example, statistical data may be processed before being graphed to remove statistical data below a threshold. In the prior example, tags with less than a threshold number of occurrences, e.g., ten, are not included in the graph to improve the usefulness of the graph to users. In the case of a line graph, using a threshold to remove less meaning full data reduces the length of the tail and in the case of a pie chart, it reduces the number of overly narrow pie slices. The data for the tags with less than a threshold number of occurrences may be excluded from graphing or may be grouped together in an "other" category.

B. Tagging Analysis

As previously described herein, search results may be "tagged" with tags, i.e., a correspondence may be established between a tag and a data item, such as an electronic document. A tag is data that conveys meaning or context. For example, a document discussing the U.S. Declaration of Independence might have corresponding tags of "U.S." and "History".

According to one embodiment, data is maintained that identifies a user or users who assigned a tag to a data item. For example, suppose that a user A assigned two tags to a particular data item. Tag assignment data is generated that indicates that user A assigned the two tags to the particular data item. Tag assignment data may be generated and maintained on host system 120, or elsewhere, depending upon a particular implementation. FIG. 6F depicts a table 640 that contains tag assignment data. The columns include an Assignor ID, which is data that identifies the entity that assigned the tag, a Tag ID that identifies the tag assigned, a Tag Category that identifies a category of the tag assigned and a Data Item ID that identifies the data item to which the tag was assigned. Tag categories may be used to provide additional semantic meanings for tags. In table 640, a single tag category is depicted for each tag for purposes of explanation only and tags may be associated with multiple categories, depending upon a particular implementation. Not all of the data depicted in table 640 is required and additional data may be included, depending upon a particular implementation. Each row of table 640 includes data for the assignment of a tag to a data item. For example, the data in the first row of table 640 indicates that User 1 assigned Tag 1 (of Category A) to Document 1. Note that the same user may assign more than one tag to the same data item. For example, as indicated by table 640, User 1 has assigned both Tag 1 and Tag 2 to Document 1. Also, multiple users may assign tags to the same data item. For example, the sixth row of table 640 indicates that User 3 has also assigned Tag 1 to Document 1.

According to one embodiment, tag analysis is performed to analyze tag assignment data and generate tagging statistics. The particular statistics generated may vary depending upon a particular implementation and embodiments are not limited to particular statistics. Example statistics include, without limitation, the number of data items tagged by assignor, the number of data items tagged by assignor and by tag, the number of tags by data item and the number of tag assignments per tag category. Tagging statistics may be displayed on a graphical user interface. For example, Web application 106 may generate one or more Web pages and transmit the one or more Web pages to client device 104. Processing of the one or more Web pages at the client device 102 causes a graphical user interface to be displayed that displays the tagging statistical data. The tagging statistics may also be exported, for example, to a file, or included in a report.

C. Semantic Meanings

According to one embodiment, semantic meanings may be used to improve the usefulness of report data. For example, referring to FIG. 6A, the statistics 604 may include a column that indicates a semantic meaning for one or more of the words. Some of the words may not have semantic meanings displayed in statistics 604. Including semantic meanings in statistics 604 can improve the relevance of the statistics 604 by providing contexts for search results.

D. Cost and Review Time Estimation

In some situations, search results may include a large amount of data. This may occur for a variety of reasons. For example, a user may use search criteria that are overly broad, the collection of data against which the search is performed is large, or both. Search results with a large amount of documents may be expensive and time consuming to review and in some situations, may be impractical to review given cost and time constraints. The amount of time required to review search results may vary depending upon a wide variety of factors, such as the number, type and complexity of items in search results and users conventionally have no way to themselves determine the amount of time required to review search results. As one simple comparison, reviewing a short email may require a relatively short amount of time compared to reviewing a large technical specification.

According to one embodiment, an estimated cost, an estimated time, or both an estimated cost and estimated time to review specified search results is determined and displayed to a user via a graphical user interface. The estimated cost and time may be determined, for example, by Web application 106, one or more other elements on host system 120, or one or more elements external to host system 120. The estimated cost and time may be determined based upon a wide variety of factors that may vary depending upon a particular implementation and embodiments are not limited to any particular factors. Example factors include, without limitation, the number, type or language of search results, or the amount of data in the search results. The different types of search results may include, for example, email, word processing documents, text files, spreadsheets, image or video files or audio files.

Figure 6H:
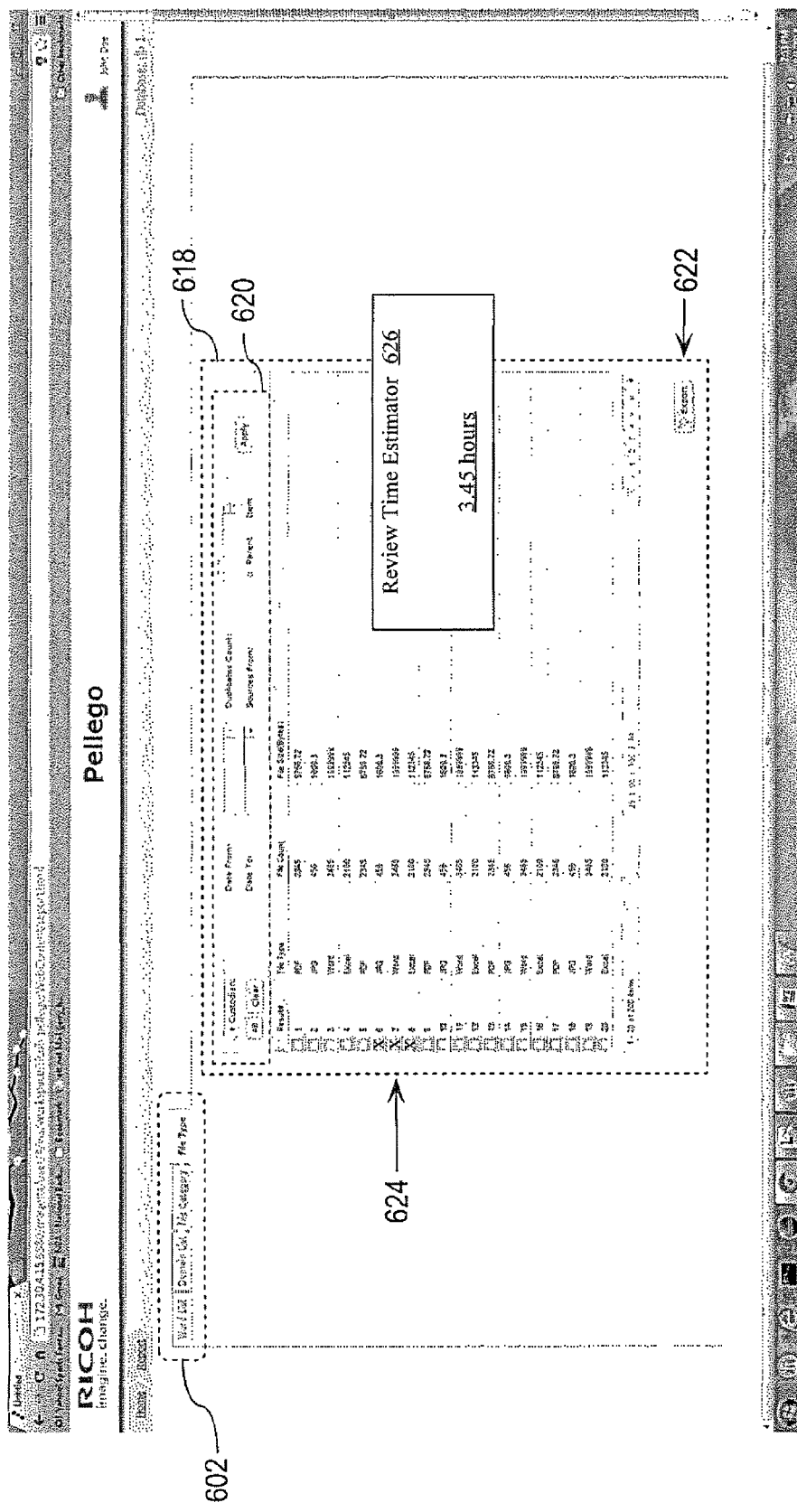
FIG. 6H depicts a review time estimator provided on graphical user interface.

FIG. 6G is a flow diagram 650 that depicts an approach for determining and displaying one or more of an estimated cost and an estimated time to review search results according to an embodiment. In step 652, search results are retrieved. This may include, for example, Web application 106 retrieving search results from a previously-completed search performed in a manner as previously described herein. The search results may be stored on host system 120 or remote to host system 120. As another example, FIG. 6H depicts statistics 618 and that a user has selected search result items #6, #7 and #8 via graphical user interface controls 624. In this example, the square icon for each search result item depicted in statistics 618 is selectable and a user has selected, for example by using a point device such as a mouse, search result items #6, #7 and #8.

In step 654, attributes of the search results are determined. The particular attributes determined may vary depending upon a particular implementation and embodiments are not limited to any particular attributes. Example attributes include, without limitation, the type (email, word processing document, data file, image data, audio/video data, etc.), language or amount of data in the search results. The attributes of the search results may be determined using a variety of different approaches. For example, the type, language or amount of data in search results may be determined by direct inspection of the search results or inspection of metadata for the search results. The search results themselves, such as a data file, or corresponding metadata may indicate the type, language and/or amount of data in the search results. The amount of data may be expressed in number of pages, number of blocks, number of bytes, etc. For example, the metadata for a data file that contains an electronic document may indicate the number of pages in the electronic document. As another example, the metadata for an audio/video file may indicate the length of the audio/video content contains in the audio/video file.

As an alternative to search results themselves indicating the type, language and/or amount of data in the search results, search results may be processed and the results of the processing analyzed to determine the type, language and/or amount of data in the search results. As one non-limiting example, search results may be processed using OCR to determine the type or language of the search results, the number of pages, or other attributes of the search results. This may be useful in situations where the file size alone may not provide an accurate indication of the number of pages in search results. For example, an image file may contain a relatively larger amount of data than a text file, but the text file may contain more pages to review than the image file. In this example, using file size alone would provide less accurate estimates than using the number of pages represented in the image file and the text file.

The custodian of search results may also be may be used to determine attributes of search results, such as language. For example, electronic document management system 102 may store, for electronic document data 112, custodian data that specifies one or more custodians for each electronic document of electronic document data 112. Custodians may have an associated language that is a default language of the custodian. Search results associated with a custodian may be presumed to be in the default language of the custodian.

In step 656, a determination is made of one or more of the estimated cost to review the search results or an estimated time to review the search results. This determination is made based upon the attributes of the search results. The way in which the attributes of the search results are considered in determining the cost and time estimates may vary depending upon a particular implementation and embodiments are not limited to any particular manner of using the attributes of the search results. Various heuristics may be used to calculate an estimated review time for selected data items.

For example, the estimated cost to review search results may be determined as a product of the number of pages in the search results and a cost per page. Similarly, the estimated time to review search results may be determined as a product of the number of pages in the search results and an amount of time per page. For audio/video files in search results, the corresponding metadata may indicate the length of the audio/video content that may be used to determine the estimated time to review the audio/video files. Alternatively, multiples of the length may be used. For example, suppose that an audio file is 20 minutes in length. An estimated time to review the audio file may be determined at one and one half times the length or 35 minutes. Weightings may also be applied based upon the types of electronic documents contained in the search results. The use of weightings may provide improved cost and time estimates for reviewing search results. For example, technical specifications may require more time and cost to review than simple emails. Therefore, according to one embodiment, weightings are applied to cost and time estimations based upon the type of search results. For example, a higher weighting may be applied to technical specifications to increase the cost and time estimates for technical specifications relative to email documents. This is but one example of using weightings and the particular approach employed may vary depending upon a particular implementation.

Equations, variables, constants and weightings used to determine the estimated cost and estimated time to review search results may be stored by Web application 106 and may be configurable, for example, by administrative personnel, or selectable by a user. The equations, variables, constants and weightings may be user specific and may also be context specific. For example, particular equations, variables, constants and weightings may be used during electronic discovery in a litigation context, while a different set of equations, variables, constants and weightings may be used in a another context.

In step 658, one or more of the estimated cost to review the search results or the estimated time to review the search results are displayed. The estimated and estimated time may be displayed using a wide variety of techniques that may vary depending upon a particular implementation. For example, as depicted in FIG. 6H, a review time estimator 626 is provided on user interface 600 and displays an estimated review time for the selected search result items #6, #7 and #8. Review time estimator 626 may be automatically displayed on user interface 600 or may be selectable, for example, via a graphical user interface object, such as an icon or menu item. Review time estimator 626 may dynamically update the estimated time as search result items are selected and deselected.

FIG. 6I depicts an example embodiment of a graphical user interface for determining and displaying an estimated cost and an estimated time to review search results. In this example, reporting controls 602 include a "Cost Estimation" tab. The "Cost Estimation" tab includes a set of graphical user interface controls 630 for using tags to select search results for which a cost and time estimation are to be determined. More specifically, a user uses graphical user interface controls 630 to select one or more tags and the search results that correspond to the selected tags are included in the estimation. Selecting tags instead of individual search results may be more convenient in situations where the search results include a large number of items. Selecting search results using tags is one example approach and embodiments are not limited to this example approach. In this example, the user has selected tags "t1", "t2" and "t3". Graphical user interface controls 630 also include an "All" control for selecting all tags and a "Clear" control for unselected selected tags.

The "Cost Estimation" tab includes a set of graphical user interface controls 632 that allow a user to specify a number of documents per hour and a cost per hour that are used to determine the estimated cost to review the search results and the estimated time to review the search results. The number of documents per hour is a review rate and is the number of documents that can be reviewed per hour of time. In the present example, a user has entered four, indicating a review rate of four documents per hour. The cost per hour is cost rate and is the hourly cost to review the number of documents per hour. In the present example, a user has entered a cost rate of $300 per hour. Thus, documents can be reviewed at a rate of four documents per hour at a cost of $300 per hour. Graphical user interface controls 632 include an "Estimate" button which, when selected, causes the estimated cost and estimate time to review the search results to be determined.

A results area 634 displays the results of the actions performed using graphical user interface controls 630, 632. More specifically, results area 634 displays the number of tagged documents and the calculated estimated cost and estimated time to review the tagged documents. The number of tagged documents is the number of search results that correspond to the tags selected via graphical user interface controls

630. In this example, there are 16 documents in the search results that correspond to tags "T1", "T2" and "T3". The estimated cost to review the tagged documents is calculated in Equation (1) below as follows:

$$\text{Estimated Cost} = (\text{Number of Tagged Documents}/\text{Number of Documents per Hour}) * \text{Cost Per Hour} \quad (1)$$

In the present example, the estimated cost is determined from Equation (1) as (16/4)*300=$1200

The estimated time to review the tagged documents is calculated in Equation (2) below as follows:

$$\text{Estimated Time} = \text{Number of Tagged Documents}/\text{Number of Documents per Hour} \quad (2)$$

In the present example, the estimated time is determined from Equation (2) as 16/4=4 hours. Although in this example the determination of the estimated cost and time to review the search results is performed on a per-document basis, embodiments are not limited to this approach and may be based upon other attributes of the search results. For example, the cost and time estimations may be made on a per-page basis instead of a per-document basis to provide more accurate estimates. Returning to FIG. 6G, in step 660, a report is optionally generated and exported. As depicted in FIG. 6I, an "Export" control 636 allows the results in results area 634 to be exported, for example, to a file. FIG. 6J depicts an example report 680 that includes all of the results information from the Cost Estimation tab depicted in FIG. 6I. Although not depicted in FIG. 6J, the tags selected by a user may also be included with the example report 680.

Figure 7:
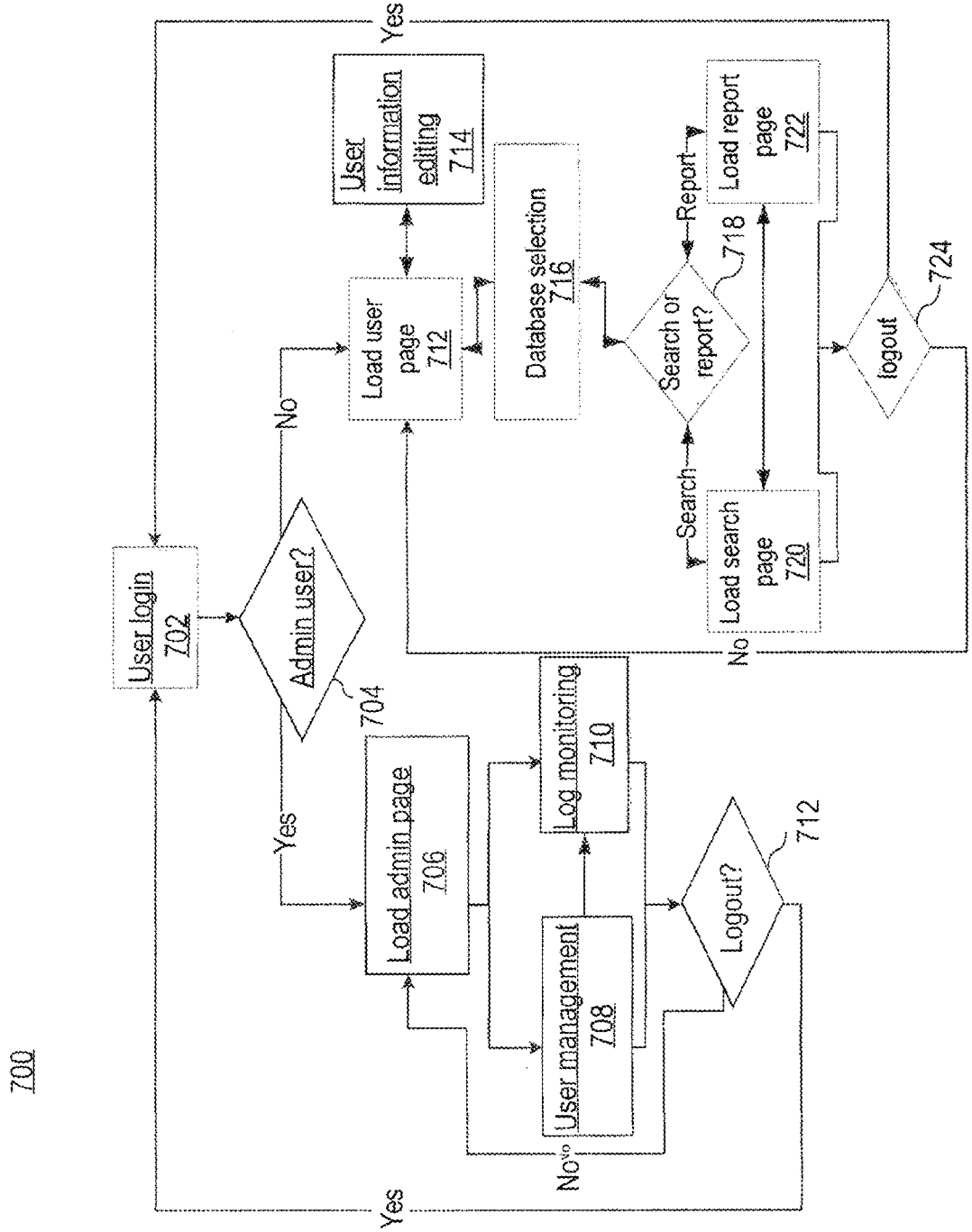
FIG. 7 is a flow diagram that depicts an approach for electronic document retrieval and reporting.

FIG. 7 is a flow diagram 700 that depicts an approach for electronic document retrieval and reporting according to an embodiment. In step 702, a user logs into the electronic document management system. For example, a user of client device 104 may use Web browser 110 to access a login Web page provided by Web Application 106. In step 704, a determination is made whether the user is an administrative user. For example, when the user logs in via the Web page, Web Application 106 may check user data 118 to determine whether the user is an administrative user.

If, in step 704, a determination is made that the user is an administrative user, then in step 706, the administrative user is given access to an administrator portal. For example, the administrative user may be given to user interface 200 as depicted in FIG. 2A that provides access to user management and logging functionality via the tabs depicted in FIG. 2A. In step 708, the administrative user accesses user management functionality, for example, as depicted in FIGS. 2A and 2B. In step 710, the administrative user accesses logging functionality, for example, as depicted in FIG. 2C. As depicted in FIG. 7, the administrative user may access both the user management functionality and the logging functionality. In step 712, a determination is made whether the administrative user has logged out of the administrator portal. If not, then the administrative user retains access to the administrator portal and control returns to step 706. If so, then control returns to step 702.

Returning to step 704, if the user is not an administrative user, then in step 712, the user is given access to a user portal. In step 714, the user is allowed to edit user information. In step 716, the user is allowed to select a data collection to access, for example, as depicted in FIG. 3. The user is then provided access to the searching and reporting functionality described herein and in step 718, a determination is made whether the user has selected to access the searching functionality or the reporting functionality. In step 720, the user may access the searching functionality, as previously described herein and depicted in FIGS. 5A-5D. In step 722, the user may access the reporting functionality, as previously described herein and depicted in FIGS. 6A-6F. In step 724, a determination is made whether the user has logged out. If not, then the user retains access to the user portal and control returns to step 712. If so, then control returns to step 702.

Figure 8B:
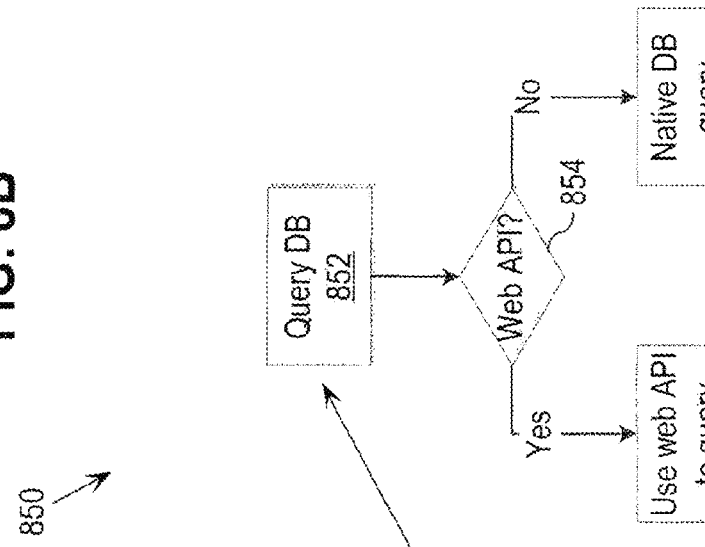
FIG. 8B is a flow diagram that depicts details of processing a query against one or more data collections.
Figure 8A:
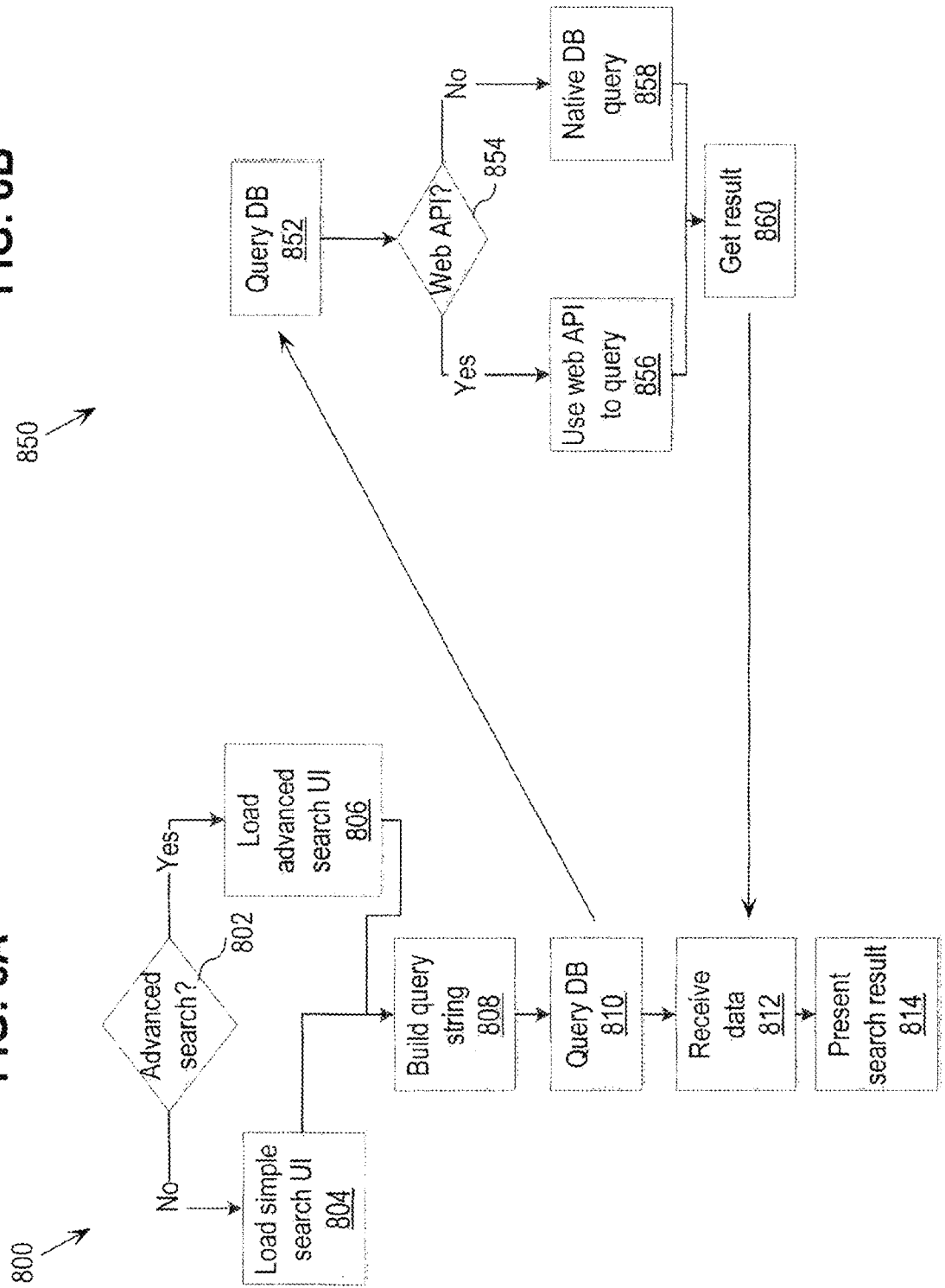
FIG. 8A is a flow diagram that depicts an approach for searching for electronic documents using an electronic document management system.

FIG. 8A is a flow diagram 800 that depicts an approach for searching for electronic documents using an electronic document management system according to an embodiment. In step 802, a determination is made whether a user has selected to perform an advanced search. For example, as depicted in FIG. 5A, a user may select a simple search or an advanced search. If the user has not selected an advanced search, then in step 804, a simple search user interface is provided to the user, for example, the user interface 400 depicted in FIG. 4. If the user has selected an advanced search, then in step 806, the advanced search user interface is provided to the user, for example, the user interface 500 depicted in FIGS. 5A-5D.

In step 808, the user builds a query string using either the simple search user interface or the advanced search user interface. In step 810, the query is processed against one or more data collections. FIG. 8B is a flow diagram 850 that depicts details of processing a query against one or more data collections. In this example, control proceeds to step 852 of FIG. 8B to perform this step. In step 854, a determination is made whether a data API is to be used. If so, then in step 856, a data API is used, for example, data API 122. If not, then in step 858, a native query is processed against the data collections. For example, the query provided by backend 116 may be processed directly against electronic document data 122, without the use of data API 122. In step 860, the result is obtained and received in step 812. In step 814, the search results are presented, for example, as depicted in FIGS. 4 and 5A-5D.

Figure 9:
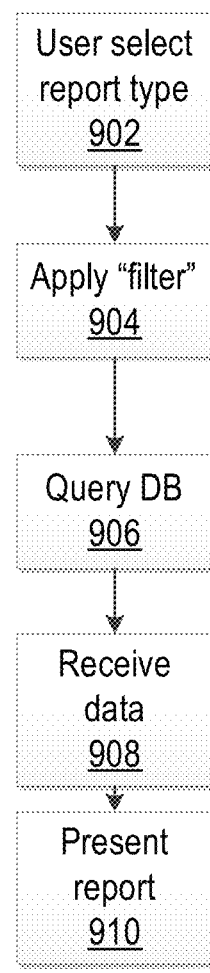
FIG. 9 is a flow diagram that depicts an approach for generating a report using an electronic document management system.

FIG. 9 is a flow diagram 900 that depicts an approach for generating a report using an electronic document management system according to an embodiment. In step 902, a user selects a report type, for example, via the various report type tabs depicted in FIG. 6A. In step 904, the user elects whether to apply one or more filters, for example, via filter controls 614 depicted in FIG. 6C. In step 906 a query is generated and applied against search results and the result is received in step 908. In step 910, a report is presented, for example, as depicted in FIGS. 6A-6F.

VI. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
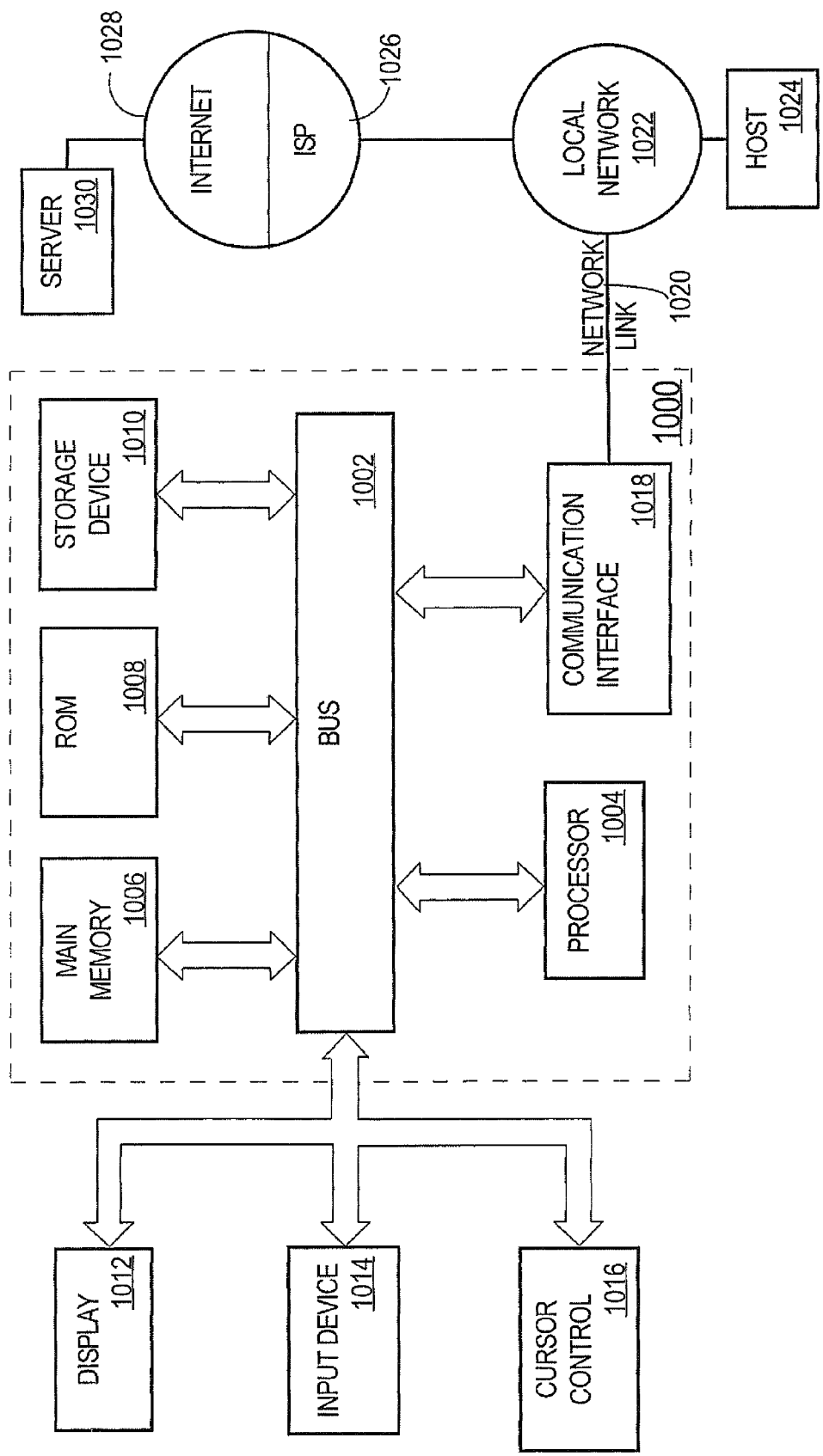
FIG. 10 is a block diagram of a computer system on which embodiments of the invention may be implemented.

FIG. 10 is a block diagram that depicts an example computer system 1000 upon which embodiments may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. Although bus 1002 is illustrated as a single bus, bus 1002 may comprise one or more buses. For example, bus 1002 may include without limitation a control bus by which processor 1004 controls other devices within computer system 1000, an address bus by which processor 1004 specifies memory locations of instructions for execution, or any other type of bus for transferring data or signals between components of computer system 1000.

An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic or computer software which, in combination with the computer system, causes or programs computer system 1000 to be a special-purpose machine. According to one embodiment, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1000, various computer-readable media are involved, for example, in providing instructions to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions which, when processed by one or more processors, cause:
a Web application generating and transmitting to a client device over one or more networks, a first set of one or more Web pages which, when processed by a Web browser at the client device, provide a graphical user interface that allows a user to specify both a simple search query that includes one or more search query terms and when processed against a plurality of data items generates a set of search results, and an advanced search query that both includes more search query terms than the simple search query and when processed against the plurality of data items, generates the set of search results;
the Web application receiving the simple search query from the client device over the one or more networks and processing the simple search query against a plurality of data items to generate a set of search results;
the Web application constructing, based upon the simple search query and the set of search results, an advanced search query that both has more search query terms than the simple search query and when processed against the plurality of data items, generates the set of search results;
the Web application transmitting to the client device over the one or more networks, a second set of one or more Web pages which, when processed by the Web browser at the client device, provide a graphical user interface that displays the set of search results and a plurality of advanced search controls that are pre-selected to specify the search query terms included in the advanced search query.

2. The one or more non-transitory computer-readable media as recited in claim 1, wherein constructing, based upon the simple search query and the set of search results, an advanced search query that both has more search query terms than the simple search query and when processed against the plurality of data items, generates the set of search results includes constructing, based upon the simple search query and the set of search results, an advanced search query that has more search query terms than the simple search query, when processed against the plurality of data items generates the set of search results and specifies one or more of: one or more custodians that correspond to the one or more search results from the first search results, one or more file types of the one or more search results from the first search results or one or more domains of the one or more search results from the first search results.

3. The one or more non-transitory computer-readable media as recited in claim 1, wherein constructing, based upon the simple search query and the set of search results, an advanced search query that both has more search query terms than the simple search query and when processed against the plurality of data items, generates the set of search results includes constructing, based upon the simple search query and the set of search results, an advanced search query that has more search query terms than the simple search query, when processed against the plurality of data items generates the set of search results and includes a proximity clause definition.

4. The one or more non-transitory computer-readable media as recited in claim 3, wherein the proximity clause definition includes two or more text words that appear within a specified distance of each other in each of the set of search results.

5. The one or more non-transitory computer-readable media as recited in claim 3, wherein the Web application:
generates two or more candidate proximity clause definitions that each includes two or more text words that appear within a specified distance of each other in each of the set of search results, and
the graphical user interface that displays the advanced search query and allows the user to change one or more of the search query terms in the advanced search query displays the two or more candidate proximity clause definitions and allows a user to select one or more candidate proximity clause definitions from the two or more candidate proximity clause definitions.

6. The one or more non-transitory computer-readable media as recited in claim 1, wherein the graphical user interface that displays the advanced search query allows the user to specify one or more of: one or more custodians, one or more file types, one or more domains, a proximity clause definition, a Boolean clause or one or more keyword phrases.

7. The one or more non-transitory computer-readable media as recited in claim 1, wherein:
the Web application receives data that indicates a user de-selection of a particular advanced search control that corresponds to a particular search query term included in the advanced search query, and
in response to the Web application receiving the data that indicates a user de-selection of a particular advanced search control that corresponds to a particular search query term included in the advanced search query, the Web application generating and transmitting to the client device over the one or more networks, a third set of one or more Web pages which, when processed by the Web browser at the client device, visually indicate to the user that one or more search results from the set of search results that satisfy the particular search query term have been removed from the set of search results.

8. An apparatus comprising:
one or more processors; and
one or more memories communicatively coupled to the one or more processors and storing instructions which, when processed by one or more processors, cause:
a Web application generating and transmitting to a client device over one or more networks, a first set of one or more Web pages which, when processed by a Web browser at the client device, provide a graphical user interface that allows a user to specify both a simple search query that includes one or more search query terms and when processed against a plurality of data items generates a set of search results, and an advanced search query that both includes more search query terms than the simple search query and when processed against the plurality of data items, generates the set of search results;
the Web application receiving the simple search query from the client device over the one or more networks and processing the simple search query against a plurality of data items to generate a set of search results;
the Web application constructing, based upon the simple search query and the set of search results, an advanced search query that both has more search query terms than the simple search query and when processed against the plurality of data items, generates the set of search results;

the Web application transmitting to the client device over the one or more networks, a second set of one or more Web pages which, when processed by the Web browser at the client device, provide a graphical user interface that displays the set of search results and a plurality of advanced search controls that are pre-selected to specify the search query terms included in the advanced search query.

9. The apparatus as recited in claim 8, wherein constructing, based upon the simple search query and the set of search results, an advanced search query that both has more search query terms than the simple search query and when processed against the plurality of data items, generates the set of search results includes constructing, based upon the simple search query and the set of search results, an advanced search query that has more search query terms than the simple search query, when processed against the plurality of data items generates the set of search results and specifies one or more of: one or more custodians that correspond to the one or more search results from the first search results, one or more file types of the one or more search results from the first search results or one or more domains of the one or more search results from the first search results.

10. The apparatus as recited in claim 8, wherein constructing, based upon the simple search query and the set of search results, an advanced search query that both has more search query terms than the simple search query and when processed against the plurality of data items, generates the set of search results includes constructing, based upon the simple search query and the set of search results, an advanced search query that has more search query terms than the simple search query, when processed against the plurality of data items generates the set of search results and includes a proximity clause definition.

11. The apparatus as recited in claim 10, wherein the proximity clause definition includes two or more text words that appear within a specified distance of each other in each of the set of search results.

12. The apparatus as recited in claim 10, wherein the Web application:
generates two or more candidate proximity clause definitions that each includes two or more text words that appear within a specified distance of each other in each of the set of search results, and
the graphical user interface that displays the advanced search query and allows the user to change one or more of the search query terms in the advanced search query displays the two or more candidate proximity clause definitions and allows a user to select one or more candidate proximity clause definitions from the two or more candidate proximity clause definitions.

13. The apparatus as recited in claim 8, wherein the graphical user interface that displays the advanced search query allows the user to specify one or more of: one or more custodians, one or more file types, one or more domains, a proximity clause definition, a Boolean clause or one or more keyword phrases.

14. The apparatus as recited in claim 8, wherein:
the Web application receives data that indicates a user de-selection of a particular advanced search control that corresponds to a particular search query term included in the advanced search query, and
in response to the Web application receiving the data that indicates a user de-selection of a particular advanced search control that corresponds to a particular search query term included in the advanced search query, the Web application generating and transmitting to the client device over the one or more networks, a third set of one or more Web pages which, when processed by the Web browser at the client device, visually indicate to the user that one or more search results from the set of search results that satisfy the particular search query term have been removed from the set of search results.

15. A computer-implemented method comprising:
a Web application generating and transmitting to a client device over one or more networks, a first set of one or more Web pages which, when processed by a Web browser at the client device, provide a graphical user interface that allows a user to specify both a simple search query that includes one or more search query terms and when processed against a plurality of data items generates a set of search results, and an advanced search query that both includes more search query terms than the simple search query and when processed against the plurality of data items, generates the set of search results;
the Web application receiving the simple search query from the client device over the one or more networks and processing the simple search query against a plurality of data items to generate a set of search results;
the Web application constructing, based upon the simple search query and the set of search results, an advanced search query that both has more search query terms than the simple search query and when processed against the plurality of data items, generates the set of search results;
the Web application transmitting to the client device over the one or more networks, a second set of one or more Web pages which, when processed by the Web browser at the client device, provide a graphical user interface that displays the set of search results and a plurality of advanced search controls that are pre-selected to specify the search query terms included in the advanced search query.

16. The computer-implemented method as recited in claim 15, wherein constructing, based upon the simple search query and the set of search results, an advanced search query that both has more search query terms than the simple search query and when processed against the plurality of data items, generates the set of search results includes constructing, based upon the simple search query and the set of search results, an advanced search query that has more search query terms than the simple search query, when processed against the plurality of data items generates the set of search results and specifies one or more of: one or more custodians that correspond to the one or more search results from the first search results, one or more file types of the one or more search results from the first search results or one or more domains of the one or more search results from the first search results.

17. The computer-implemented method as recited in claim 15, wherein constructing, based upon the simple search query and the set of search results, an advanced search query that both has more search query terms than the simple search query and when processed against the plurality of data items, generates the set of search results includes constructing, based upon the simple search query and the set of search results, an advanced search query that has more search query terms than the simple search query, when processed against the plurality of data items generates the set of search results and includes a proximity clause definition.

18. The computer-implemented method as recited in claim 17, wherein the proximity clause definition includes two or more text words that appear within a specified distance of each other in each of the set of search results.

19. The computer-implemented method as recited in claim 17, wherein the Web application:
   generates two or more candidate proximity clause definitions that each includes two or more text words that appear within a specified distance of each other in each of the set of search results, and
   the graphical user interface that displays the advanced search query and allows the user to change one or more of the search query terms in the advanced search query displays the two or more candidate proximity clause definitions and allows a user to select one or more candidate proximity clause definitions from the two or more candidate proximity clause definitions.

20. The computer-implemented method as recited in claim 15, wherein:
   the Web application receives data that indicates a user de-selection of a particular advanced search control that corresponds to a particular search query term included in the advanced search query, and
   in response to the Web application receiving the data that indicates a user de-selection of a particular advanced search control that corresponds to a particular search query term included in the advanced search query, the Web application generating and transmitting to the client device over the one or more networks, a third set of one or more Web pages which, when processed by the Web browser at the client device, visually indicate to the user that one or more search results from the set of search results that satisfy the particular search query term have been removed from the set of search results.

* * * * *